US009019293B2

(12) United States Patent
Tsuzaki et al.

(10) Patent No.: US 9,019,293 B2
(45) Date of Patent: Apr. 28, 2015

(54) IMAGE DISPLAY DEVICE, METHOD OF DRIVING THE SAME, IMAGE DISPLAY PROGRAM EXECUTED IN THE SAME, AND GRADATION CONVERTER INCLUDED IN THE SAME

(75) Inventors: Ryoichi Tsuzaki, Kanagawa (JP); Naoyuki Takasaki, Kanagawa (JP)

(73) Assignee: Japan Display Inc., Tokyo (JP)

( * ) Notice: Subject to any disclaimer, the term of this patent is extended or adjusted under 35 U.S.C. 154(b) by 101 days.

(21) Appl. No.: 13/334,990

(22) Filed: Dec. 22, 2011

(65) Prior Publication Data

US 2012/0182305 A1 Jul. 19, 2012

(30) Foreign Application Priority Data

Jan. 13, 2011 (JP) ................................ 2011-004932

(51) Int. Cl.
*G09G 5/02* (2006.01)
*G09G 3/20* (2006.01)
*G06K 9/00* (2006.01)
*G09G 3/36* (2006.01)

(52) U.S. Cl.
CPC ............ *G09G 3/2059* (2013.01); *G09G 3/3666* (2013.01); *G09G 2320/0261* (2013.01)

(58) Field of Classification Search
None
See application file for complete search history.

(56) References Cited

U.S. PATENT DOCUMENTS

| | | | | |
|---|---|---|---|---|
| 6,031,543 | A * | 2/2000 | Miyashita et al. | 345/593 |
| 6,307,978 | B1 * | 10/2001 | Metaxas | 382/252 |
| 6,343,159 | B1 | 1/2002 | Cuciurean-Zapan et al. | |
| 7,782,284 | B2 * | 8/2010 | Inada et al. | 345/89 |
| 8,213,054 | B2 * | 7/2012 | Suzuki | 358/3.03 |
| 2004/0263910 | A1 * | 12/2004 | Chang et al. | 358/3.03 |
| 2005/0088700 | A1 * | 4/2005 | Aoki et al. | 358/3.03 |
| 2008/0239338 | A1 * | 10/2008 | Bailey et al. | 358/1.9 |

FOREIGN PATENT DOCUMENTS

| | | |
|---|---|---|
| JP | 10-003282 | 1/1998 |
| JP | 10-028248 | 1/1998 |

OTHER PUBLICATIONS

Japanese Office Action issued in connection with related Japanese Patent Application No. JP 2011-004932 issued on May 20, 2014.

* cited by examiner

*Primary Examiner* — Joni Richer
*Assistant Examiner* — Yi Wang
(74) *Attorney, Agent, or Firm* — Dentons US LLP

(57) ABSTRACT

Disclosed herein is an image display device, including: a display block displaying thereon an image by using pixels disposed in a two dimensional matrix; and a gradation converting block executing gradation converting processing by using an error diffusion method, wherein the gradation converting block partitions an area in which the pixels are disposed into virtual partitions, and carries out the error diffusion when the gradation converting processing is executed with respect to the pixels within the virtual partition exclusively within the virtual partition, thereby carrying out gradation conversion for the image which is displayed on the display block.

11 Claims, 23 Drawing Sheets

FIG.6A
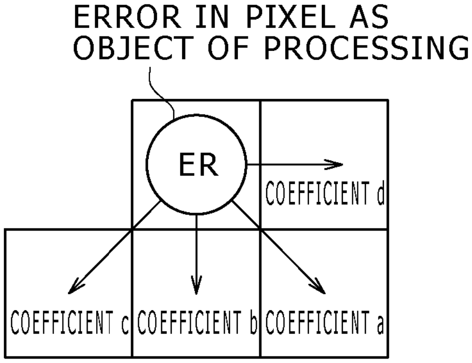
FIG.6B
| | | |
|---|---|---|
| | curr | 7/16 |
| 3/16 | 5/16 | 1/16 |
FIG.6C
| | | |
|---|---|---|
| | curr | 1/2 |
| 1/4 | 1/4 | 0 |
FIG.6D
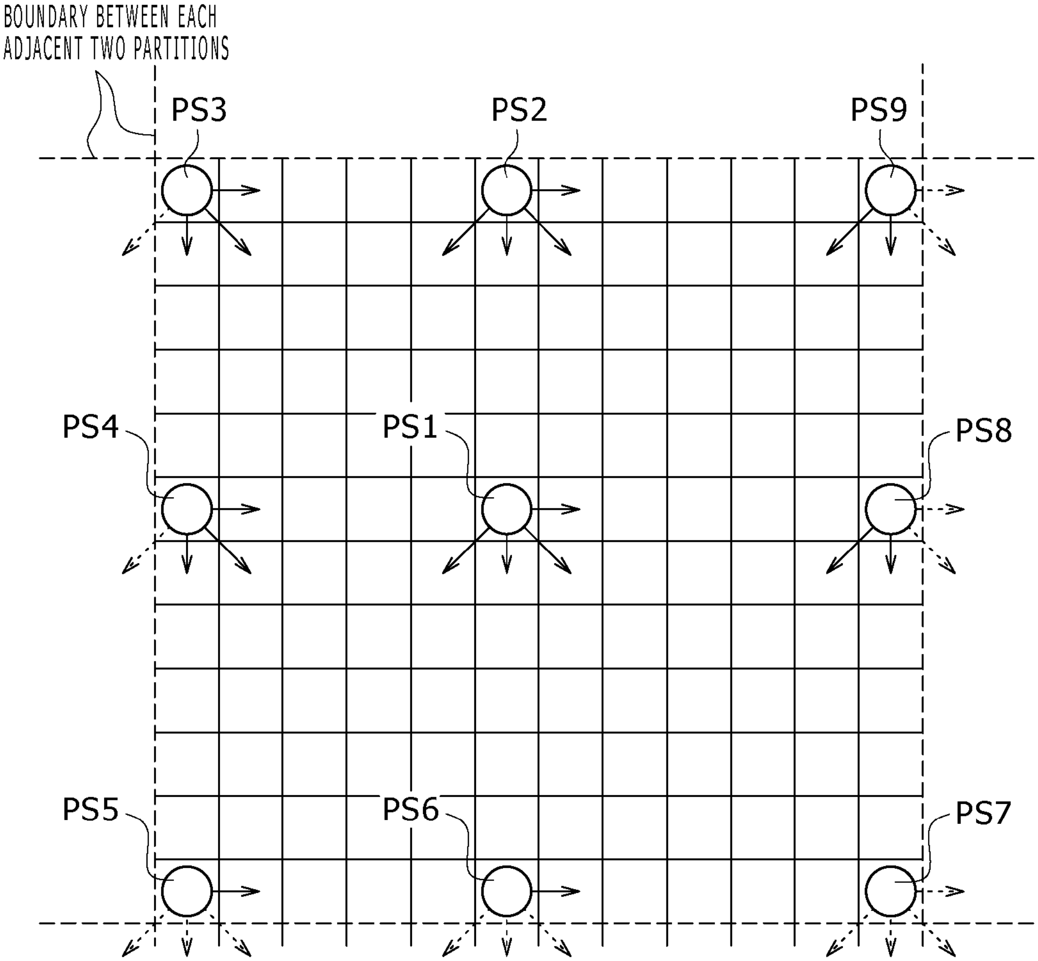

FIG. 8A

| | | | | |
|---|---|---|---|---|
| | | curr | 7/48 | 5/48 |
| 3/48 | 5/48 | 7/48 | 5/48 | 3/48 |
| 1/48 | 3/48 | 5/48 | 3/48 | 1/48 |

FIG. 8B

| | | | | |
|---|---|---|---|---|
| | | curr | 8/42 | 4/42 |
| 2/42 | 4/42 | 8/42 | 4/42 | 2/42 |
| 1/42 | 2/42 | 4/42 | 2/42 | 1/42 |

FIG. 8C

| | | | | |
|---|---|---|---|---|
| | | curr | 4/16 | 2/16 |
| 1/16 | 2/16 | 4/16 | 2/16 | 1/16 |

IMAGE DISPLAY DEVICE, METHOD OF DRIVING THE SAME, IMAGE DISPLAY PROGRAM EXECUTED IN THE SAME, AND GRADATION CONVERTER INCLUDED IN THE SAME

RELATED APPLICATION DATA

The present disclosure contains subject matter related to that disclosed in Japanese Priority Patent Application JP 2011 004932 filed in the Japan Patent Office on Jan. 13, 2011, the entire content of which is hereby incorporated by reference.

BACKGROUND

The present disclosure relates to an image display device for displaying an image on a display block such as a liquid crystal display panel. In addition, the present disclosure relates to a method of driving the image display device, an image display program executed by the image display device, and a gradation converter included in the image display device.

A liquid crystal display panel adapted to either monochrome display or color display, an electro luminescence display panel using an electroluminescence of either an inorganic material or an organic material, a plasma display panel or the like is used in a display block of a portable electronic apparatus such as a mobile phone or a personal digital assistance, a personal computer, a television receiver or the like.

When a gradation display ability of a pixel of the display block is low, in a word, when the number of gradations in the pixels is small, a contour line like outline is generated in a gradation portion of an image, and as a result, an image quality is reduced. It is known that in such a case, the image quality is enhanced by using an error diffusion method.

The error diffusion method is such that a weight coefficients are added to plural adjacent pixels, respectively, and in this state, an error generated when multivalued image data, for example, is converted into binary image data (that is, a difference between the multivalued image data and the binary image data) is diffused into the plural adjacent pixels. The error diffusion method, for example, is disclosed in R. W. Floyd and L. Steinberg: An adaptive algorithm for spatial grayscale, Journal of the Society for Information Display Vol. 17, No. 2, pp. 75 to 77, 1976 (Non Patent Document). According to the error diffusion method, it is possible to averagely minimize the error generated between the multivalued original image and a half tone image, for example, binarized. As a result, it is possible to produce the half tone image having the excellent image quality.

SUMMARY

The error diffusion method is a practical technique because a load applied to a calculation is light. However, even when a part of the original image is changed, a change in error diffusion extends over a wide range of the half tone image.

For example, in the case of the Floyd Steinberg method typified in the error diffusion method, as shown in FIGS. 6A and 6B, the error is diffused into a pixel next to a pixel as an object of processing and three pixels located below a line of the pixel next to the pixel as the object of the processing by one line. Therefore, for example, even when a value of the multivalued image data corresponding to certain one pixel is changed, as shown in FIG. 23, the gradation can be changed over the wide range due to the influence of the error diffusion. For this reason, when gradation processing for a moving image is executed by using the error diffusion method, the picture buzzes to spoil a view in some cases.

The present disclosure has been made in order to solve the problems described above, and it is therefore desirable to provide an image display device, a method of driving the image display device, an image display program executed in the image display device, and a gradation converter included in the image display device which make it possible to lighten the buzzing of the picture when the gradation processing for the moving image is executed.

In order to attain the desire described above, according to an embodiment of the present disclosure, there is provided an image display device including: a display block displaying thereon an image by using pixels disposed in a two dimensional matrix; and a gradation converting block executing gradation converting processing by using an error diffusion method. The gradation converting block partitions an area in which the pixels are disposed into virtual partitions, and carries out the error diffusion when the gradation converting processing is executed with respect to the pixels within the virtual partition exclusively within the virtual partition, thereby carrying out gradation conversion for the image which is displayed on the display block.

According to another embodiment of the present disclosure, there is provided a method of driving an image display device using the image display device including a display block displaying thereon an image by using pixels disposed in a two dimensional matrix, and a gradation converting block executing gradation converting processing by using an error diffusion method, the method including: partitioning an area in which the pixels are disposed into virtual partitions by the gradation converting block; and carrying out the error diffusion when the gradation converting processing is executed with respect to the pixels within the virtual partition exclusively within the virtual partition by the gradation converting block, thereby carrying out gradation conversion for the image which is displayed on the display block.

According to still another embodiment of the present disclosure, there is provided an image display program including: being executed in the image display device including a display block displaying thereon an image by using pixels disposed in a two dimensional matrix, and a gradation converting block executing gradation converting processing by using an error diffusion method; partitioning an area in which the pixels are disposed into virtual partitions by the execution; and carrying out the error diffusion when the gradation converting processing is executed with respect to the pixels within the virtual partition exclusively within the virtual partition by the execution, thereby carrying out gradation conversion for the image which is displayed on the display block.

According to yet another embodiment of the present disclosure, there is provided a gradation converter including: a gradation converting block executing gradation converting processing by using an error diffusion method, in which the gradation converting block partitions an area in which the pixels are disposed into virtual partitions, and carries out the error diffusion when the gradation converting processing is executed with respect to the pixels within the virtual partition exclusively within the virtual partition, thereby carrying out gradation conversion for the image.

As set forth hereinabove, according to the image display device of the embodiments of the present disclosure, the area in which the pixels are disposed are partitioned into the virtual partitions. Also, the error diffusion when the gradation converting processing is executed with respect to the pixels within the partition is carried out exclusively within the partition. Therefore, when a part of the original image is changed, the change in error diffusion is prevented from extending over the wide range of the half tone image. As a result, it is possible to lighten the buzzing of the picture when the gradation processing for the moving image is executed. In addition, the using of the method of driving the image display device, the image display program for driving the image display device, and the gradation converter of the present disclosure makes it possible to lighten the buzzing of the picture when the gradation processing for the moving image is executed.

BRIEF DESCRIPTION OF THE DRAWINGS

FIG. 6A is a schematic top plan view explaining the pixels into which the error is diffused, and weight coefficients of the pixels;

FIG. 6B is a diagram showing values of the weight coefficients in the case of a Floyd Steinberg type;

FIG. 6C is a diagram showing values of the weight coefficients in the case of a Sierra Filter Lite type;

FIG. 6D is a schematic top plan view explaining the error diffusion extending over the partitions is not carried out;

FIGS. 8A to 8C are respectively diagrams showing other examples of the weight coefficients of the error diffusion;

DETAILED DESCRIPTION OF THE PREFERRED EMBODIMENTS

Figure 1:
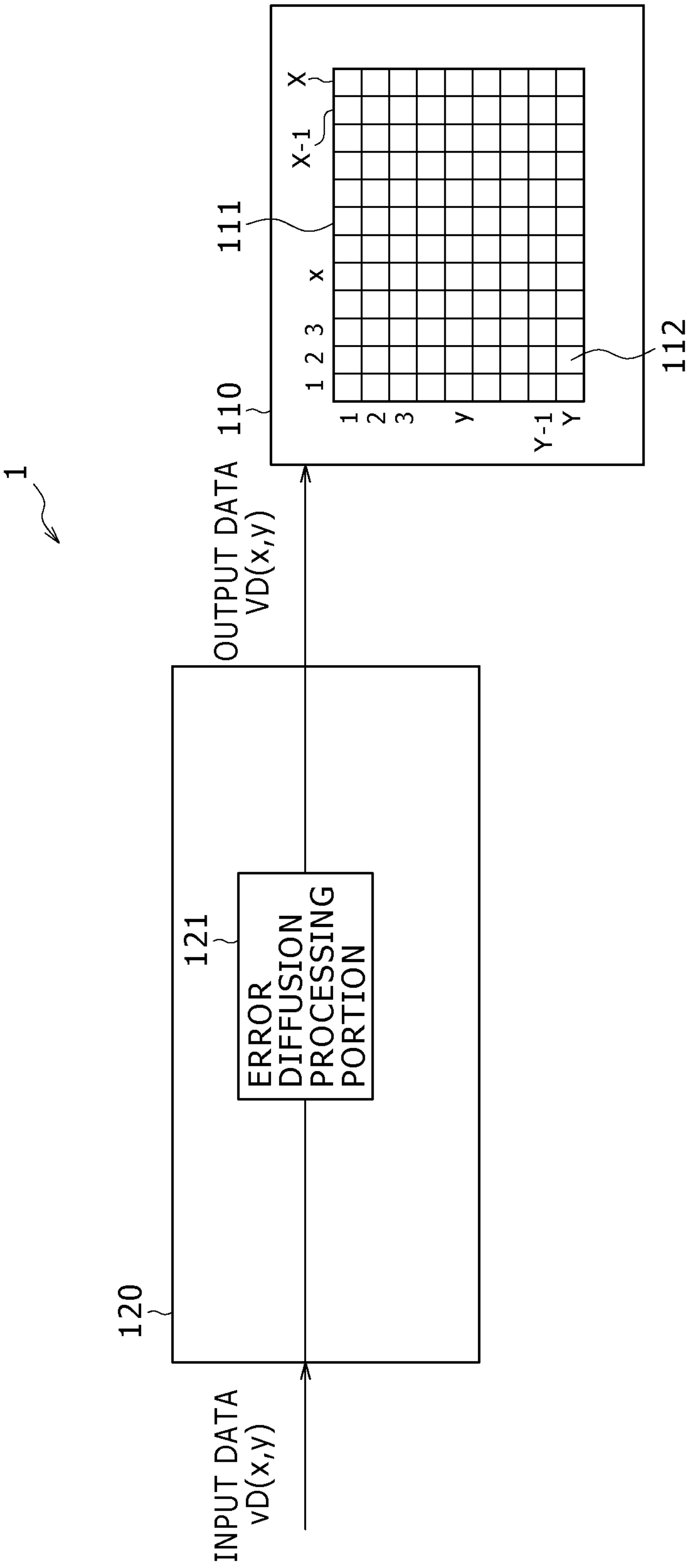
FIG. 1 is a conceptual view showing a configuration of an image display device according to a first embodiment of the present disclosure.

Embodiments of the present disclosure will be described in detail hereinafter with reference to the accompanying drawings. The present disclosure is by no means limited to the embodiments, and thus various numerical values and materials in the embodiments are merely exemplified. In the following description, the same constituents or constituent elements having the same functions are designated by the same reference numerals, respectively, and a repeated description thereof is omitted for the sake of simplicity. It is noted that the description will be given below in accordance with the following order:

1. Description of the Whole of Image Display Device, Method of Driving the Image Display Device, Image Display Program Executed in the Image Display Device, and Gradation Converter According to the Present Disclosure;
2. First Embodiment; and
3. Second Embodiment (and Others).

[Description of the Whole of Image Display Device, Method of Driving Image Display Device, Image Display Program Executed in Image Display Device, and Gradation Converter According to the Present Disclosure]

A configuration and a system of a display block for displaying thereon an image are especially by no means limited in an image display device according to the present disclosure, an image display device used in a method of driving the image display device according to the present disclosure, or an image display device executing an image display program according to the present disclosure (hereinafter these image display devices will be simply referred to as “an image display device according to the present disclosure” in some cases). For example, the well known display device such as a liquid crystal display panel, an electroluminescence display panel or a plasma display panel can be used as a display block. Or, display media such as an electrically rewritable electronic paper can be used as a display block. Also, the display block either may be made to be adapted to the monochrome display or may be made to be adapted to the color display.

A gradation converting block for executing gradation converting processing by using an error diffusion method or a gradation converter including the gradation converting block, for example, can be composed of an arithmetically operating circuit and a memory device. Each of the arithmetically operating circuit and the memory device can be configured by using the well known circuit elements or the like.

The gradation converting processing executed by the gradation converting block, for example, may be processing for converting a multivalued image into a binary image such as processing for converting 256 gradations into two gradations. Or, the gradation converting processing executed by the gradation converting block, for example, may also be processing for converting a multivalued image into a multivalued image having the less number of gradations such as the processing for converting 256 gradations into four gradations.

As described above, in the image display device according to the embodiment of the present disclosure, an area in which pixels are disposed are partitioned into virtual partitions, and error diffusion when the gradation converting processing is executed with respect to the pixels within the partition is carried out exclusively within the partition. Therefore, when a value of multivalued image data corresponding to certain one pixel is changed, an influence of the error diffusion is fitted within one partition. As a result, it is possible to reduce the buzzing of the moving image.

In this case, the gradation converting block can be configured in such a way that the area in which the pixels are disposed is partitioned by plural kinds of virtual partitions, and a result of the gradation converting processing in an area which is an area within the partition and which does not include the pixels located in the vicinities of a boundary between each adjacent two partitions is selected, thereby carrying out the gradation conversion for the image which is displayed on the display block. In this case, a shape of the area which does not include any of the pixels located in the vicinities of the boundary can be made as a tessellating pattern.

The shape of the area which does not include any of the pixels located in the vicinities of the boundary either may be tessellating in a state in which the apexes agree with each other, or may be tessellating in a state in which the apexes are shifted from each other. The shape of the area which does not include any of the pixels located in the vicinities of the boundary, for example, either may be a regular tessellating pattern such as a regular triangle, a square or a regular hexagon, or may be a regular tessellating pattern having irregularities added thereto. In addition, an arbitrary triangle or quadrangle can be given as the tessellating pattern.

Preferably, the shape of the area which does not include any of the pixels located in the vicinity of the boundary is made one kind of shape from a viewpoint of easiness of the control. It is noted that the shape of the area which does not include any of the pixels located in the vicinities of the boundary can be formed so as to include plural kinds of shapes in some cases. For example, it is also possible to adopt a structure such that a certain rectangular area is tessellated with the same triangles, and a rectangular area adjacent to a certain rectangular area is tessellated with the same quadrangles.

In the image display device according to the embodiment of the present disclosure including the various kinds of preferable constitutions described above, the shape of the partition is especially by no means limited. The shape of the partition is preferably made the rectangle from a viewpoint of the easiness of the control.

In the image display device according to the embodiment of the present disclosure including the various kinds of preferable constitutions described above, the pixel may be composed of a single pixel. Or, the pixel may also be composed of plural kinds of sub pixels. In the case of the latter, it is only necessary to adopt a constitution such that the gradation converting block executes the gradation converting processing every kind of sub pixel.

Although in addition to VGA (640, 480), S VGA (800, 600), XGA (1,024, 768), APRC (1,152, 900), S XGA (1,280, 1,024), U XGA (1,600, 1,200), HD TV (1,920, 1,080), and Q XGA (2,048, 1,536), some of resolutions for the image display such as (1,920, 1,035), (720, 480), and (1,280, 960) can be exemplified as the values of the pixels, the present disclosure is by no means limited to these values.

The image display program according to the embodiment of the present disclosure is executed in the image display device including a display block for displaying thereon an image by using the pixels disposed in a two dimensional matrix, and a gradation converting block for executing gradation converting processing using an error diffusion method. As a result, an area in which pixels are disposed are partitioned into virtual partitions, and error diffusion when the gradation converting processing is executed with respect to the pixels within the partition is carried out exclusively within the partition, thereby carrying out gradation conversion for the image which is displayed on the display block.

For example, it is possible to adopt a configuration such that the image display program is stored in a memory section such as a semiconductor memory, a magnetic disc, or an optical disc, and the processing described above is executed in the gradation converting block.

First Embodiment

A first embodiment of the present disclosure relates to the image display device. It is noted that a description will also be given below with respect to a method of driving the image display device, an image display program executed by the image display device, and a gradation converter included in the image display device in relation to the image display device according to the first embodiment of the present disclosure.

FIG. 1 is a conceptual view of the image display device according to the first embodiment of the present disclosure.

The image display device 1 of the first embodiment includes a display block 110 and a gradation converting block (gradation converter) 120. In this case, the display block 110 displays thereon an image by using pixels 112 disposed in a two dimensional matrix. Also, the gradation converting block (gradation converter) 120 executes gradation converting processing by using an error diffusion method.

The display block 110 is composed of a liquid crystal display panel made to be adapted to the monochrome display. X pixels 112 in a horizontal direction (hereinafter referred to as “a row direction” in some cases), and Y pixel in a vertical direction (hereinafter referred to as “a column direction” in some cases), that is, (X×Y) pixels 112 in total are disposed in a tow dimensional matrix in the display block 110. In the case of a transmission type display panel, light transmittances of the pixels 112 are controlled in accordance with a value of output data VD, whereby a transmission quantity of light from a light source circuit (not shown) is controlled, thereby displaying an image on the display block 110. On the other hand, in the case of a reflection type display panel, light reflectivities of the pixels 112 are controlled in accordance with the value of the output data VD, whereby a reflection quantity of outside light is controlled, thereby displaying an image on the display block 110.

The gradation converting block 120 includes an error diffusion processing portion 121 for executing processing by using the error diffusion method. Input data vD is inputted to the gradation converting block 120 so as to correspond to the pixels 112, respectively. The gradation conversion is carried out by the error diffusion processing portion 121, thereby outputting the output data VD.

The gradation converting block 120 partitions an area in which the pixels 112 are disposed into virtual partitions 121A in accordance with an image display program stored in a memory device (not shown). Also, the gradation converting block 120 carries out the error diffusion when the gradation converting processing is executed with respect to the pixels 112 within the partition 121A exclusively within the partition 121A, thereby carrying out the gradation conversion of the image which is displayed on the display block 110. It is noted that the partition 121A will be described in detail later with reference to FIG. 3.

The pixel 112 located in an x th column (x=1, 2, . . . , X) and in a y th row (y=1, 2, . . . , Y) is represented in the form of either an (x, y) th pixel 112 or a pixel 112(x, y). Also, the input data vD and the output data VD each corresponding to the pixel 112(x, y) are represented in the form of the input data vD(x, y) and the output data VD(x, y), respectively.

Figure 2:
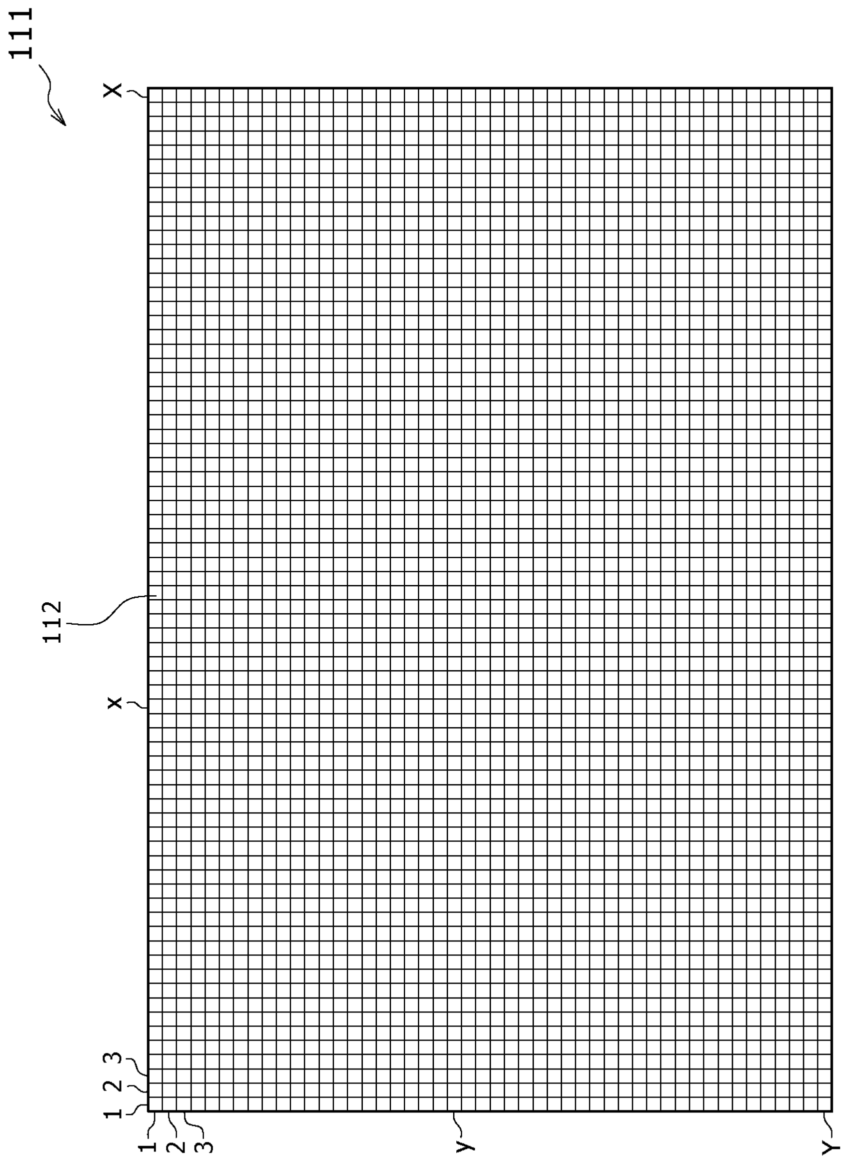
FIG. 2 is a schematic top plan view explaining a disposition of pixels in a display area of the image display device according to the first embodiment of the present disclosure.
Figure 3:
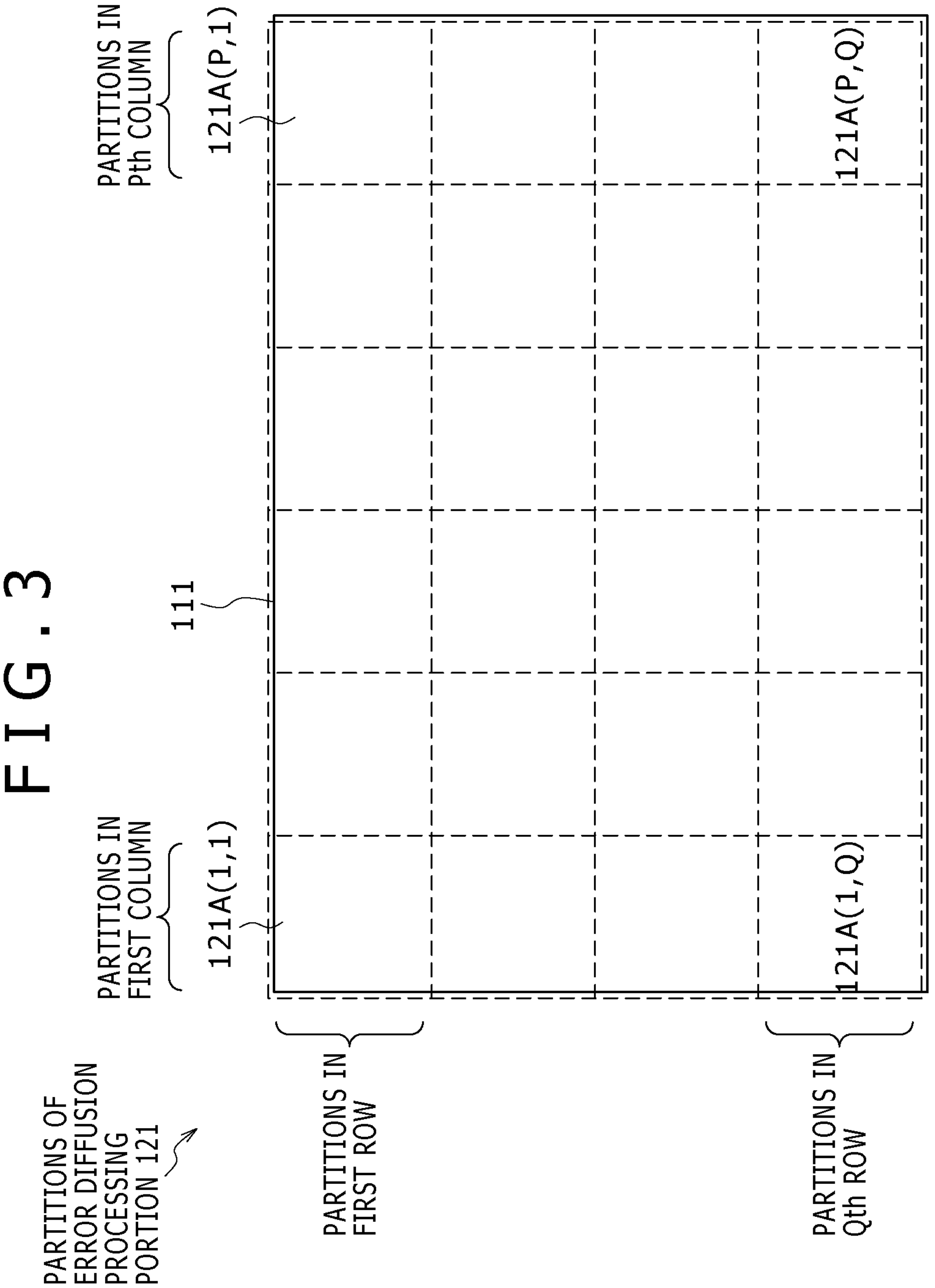
FIG. 3 is a schematic top plan view explaining a relationship between the display area and partitions within which an error diffusion processing portion composing a gradation converting block executes gradation processing.

FIG. 2 is a schematic top plan view explaining a disposition of the pixel in the display area. FIG. 3 is a schematic top plan view explaining a relationship between the display area, and the partition within which the error diffusion processing portion executes the gradation processing. It is noted that for the sake of convenience of an illustration, the illustration of the pixels 112 is omitted in FIG. 3. In addition, in FIG. 3, and FIG. 4 which will be shown later, a boundary between each adjacent two partitions 121A is shown in a shifting manner so as not to overlap any of other lines for the sake of convenience.

As described above, the gradation converting block 120 partitions the area in which the pixels 112 are disposed into the virtual partitions 121A. Also, the gradation converting block 120 carries out the error diffusion when the gradation converting processing is executed with respect to the pixels 112 within the partition 121A exclusively within the partition 121A, thereby carrying out the gradation conversion of the image which is displayed on the display block 110.

Figure 4:
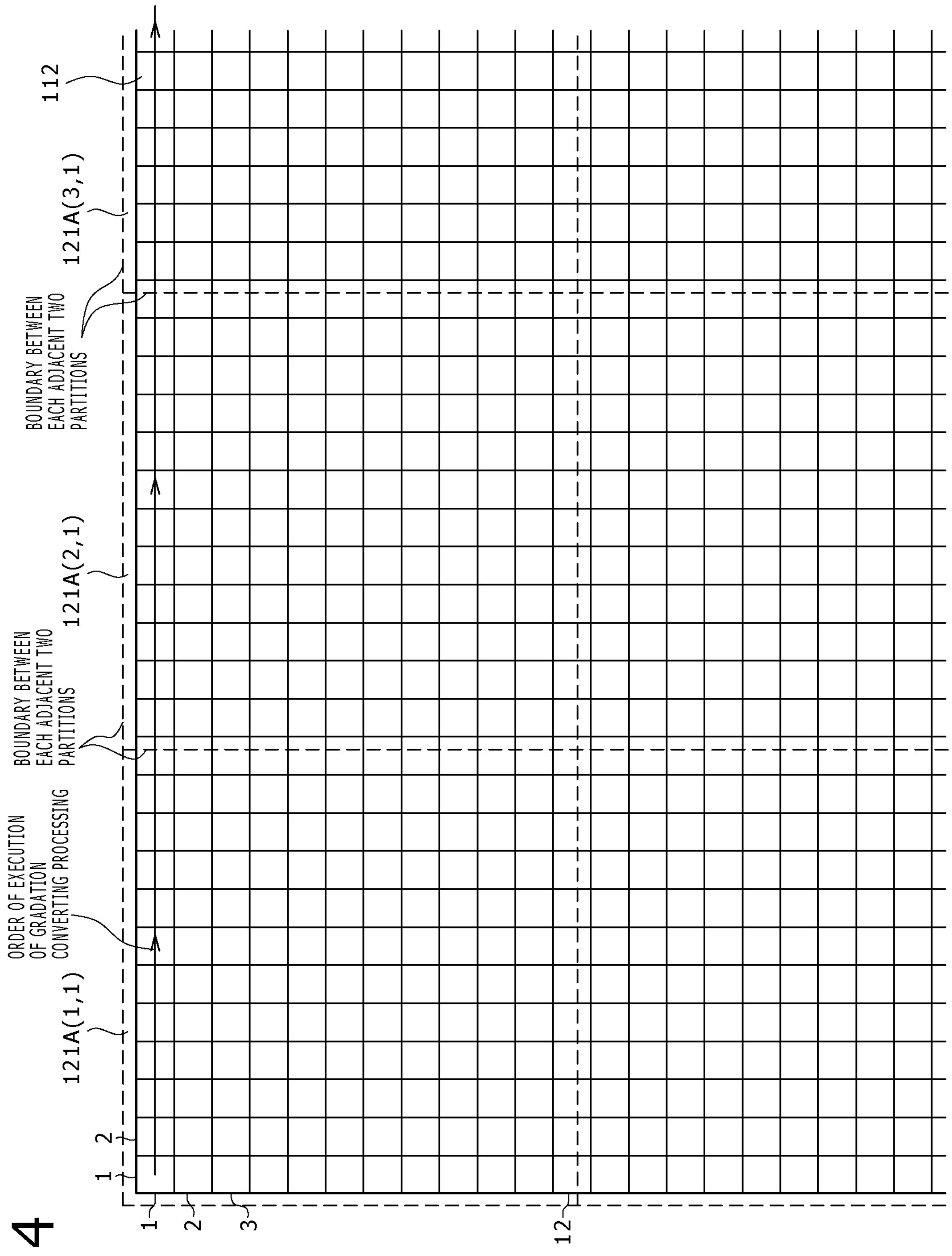
FIG. 4 is a schematic top plan view explaining the gradation processing executed by the error diffusion processing portion composing the gradation converting block.

In the image display device 1 of the first embodiment, each of the partitions 121A has a rectangular shape. Also, as shown in FIG. 4, the 12 pixels 112 in the row direction, and the 12 pixels in the column direction, that is, the (12×12) pixels 112 in total correspond to one partition 121A. As shown in FIG. 3, the P partitions 121A in row direction, and the Q partitions 121A in the column direction, that is, the (P×Q) partitions 121A are disposed. Also, if there is no surplus in the pixels 121A, a relationship of P=X 12 and Q=Y 12 is obtained. It is noted that the number of pixels 112 corresponding to one partition 121A is by no means limited to the value described above, and thus it is only necessary to suitably set the number of pixels 112 corresponding to one partition 121A to a preferable value depending on the design of the image display device 1. It is noted that although in FIG. 3, the (6×4) partitions 121A are shown, this is merely an exemplification.

The partition 121A located in the p th column (p=1, 2, . . . , P), and in the q th row (q=1, 2, . . . , Q) is represented in the form of either the (p, q) th partition 121A or the partition 121A(p, q).

The (X×Y) pieces of input data vD(1, 1) to vD(X, Y) are successively supplied to the gradation converting block 120 every display frame. Specifically, firstly, the X pieces of input data vD(1, 1) to vD(X, 1) are successively supplied to the gradation converting block 120. Next, the X pieces of input data vD(1, 2) to vD(X, 2), the X pieces of input data vD(1, 3) to vD(X, 3), . . . , the X pieces of input data vD(1, Y) to vD(X, Y) are successively supplied to the gradation converting block 120.

The gradation converting block 120 successively executes the (X×Y) pieces of gradation converting processing with respect to the (X×Y) pieces of input data vD thus inputted thereto every display frame, and outputs the (X×Y) pieces of output data VD. Hereinafter, the gradation converting processing will be described in detail.

Figure 5:
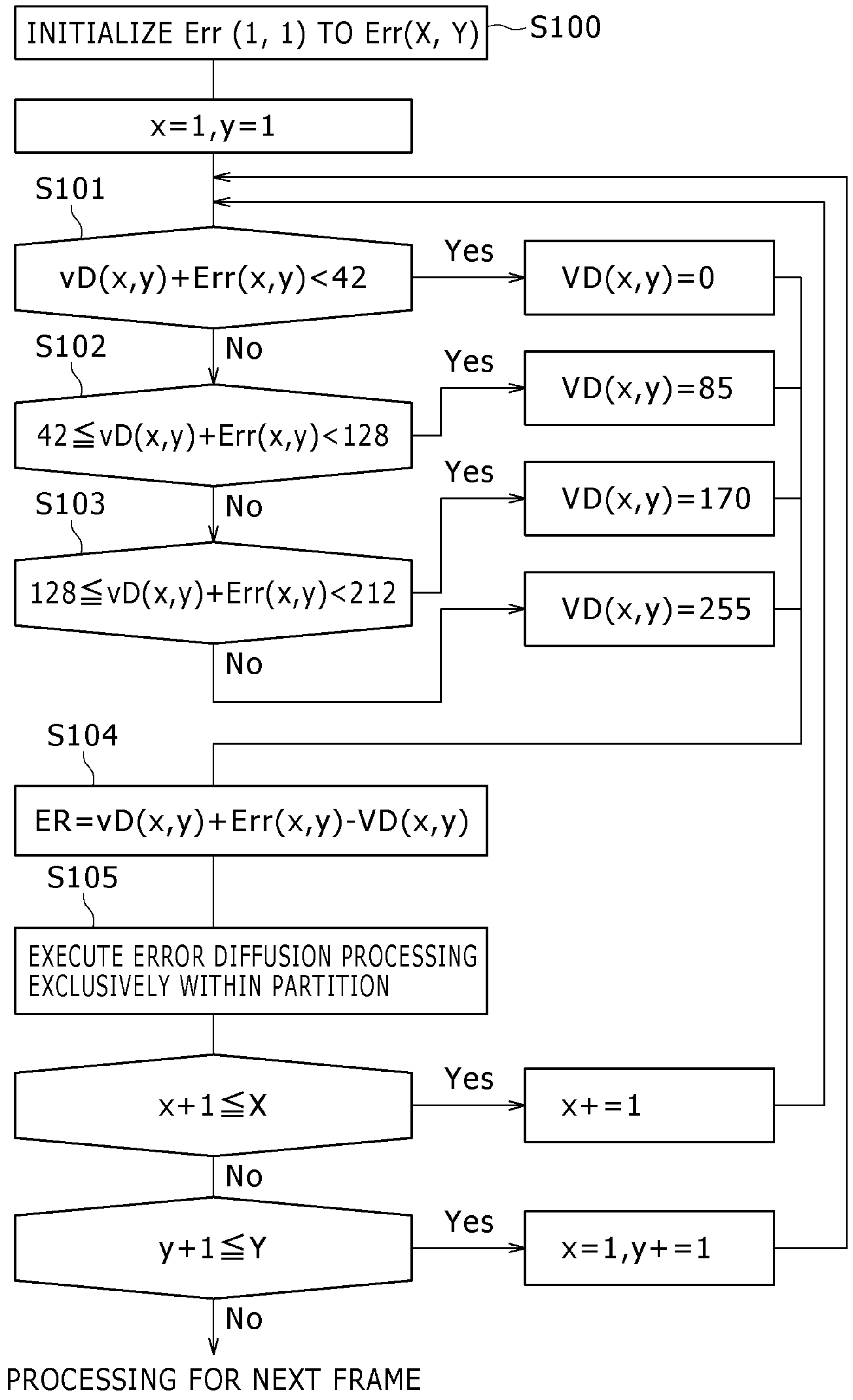
FIG. 5 is a flow chart explaining an operation of the gradation processing executed by the error diffusion processing portion composing the gradation converting block.

FIG. 4 is a schematic top plan view explaining the gradation processing executed by the gradation converting block. FIG. 5 is a flow chart explaining an operation of the gradation processing executed by the gradation converting block.

As described above, the (X×Y) pieces of input data vD(1, 1) to vD(X, Y) are successively supplied to the gradation converting block 120 every display frame. Therefore, as shown in FIG. 4, firstly, the gradation conversion is carried out with respect to the input data vD corresponding to the pixel 112(1, 1) located at the top left end of the partition 121A(1, 1). After that, the gradation conversion is successively carried out with respect to the (X 2) pieces of input data vD corresponding to the pixels 112 located on the right hand side of the preceding pixel 112. When the gradation conversion with respect to the input data vD corresponding to the pixel 112(1, X) (not shown in FIG. 4) has been ended, the X pieces of gradation converting processing are successively executed with respect to the X pieces of input data vD corresponding to the pixels 112(1, 2) to 112(X, 2), respectively, located below the first row of the pixels 112(1, 1) to 112(1, X) by one row.

The operation of the gradation converting processing will now be described in detail with reference to FIGS. 4 and 5. It is noted that although the operation of the gradation converting processing for converting the 256 gradations into the four gradations will now be described as the operation of the gradation converting processing, the present disclosure is by no means limited thereto.

Firstly, (X×Y) error amount storing portions Err(1, 1) to Err(X, Y) each of which is composed of a buffer (not shown) or the like and which store therein (X×Y) error amounts corresponding to the (X×Y) pixels 112, respectively, are all initialized as a premise of the gradation converting processing (Step S100). Specifically, values in the (X×Y) error amount storing portions Err(1, 1) to Err(X, Y) are each set to "zero."

In each of the display frames, firstly, the gradation converting processing for the input data D(1, 1) is executed. Therefore, in the case where x=1 and y=1, calculations with respect to the input data vD(x, y) are carried out.

Specifically, when a value obtained by adding the value in the error amount storing portion Err(x, y) to the value of the input data vD(x, y) is smaller than 42, the value of the output data VD(x, y) is set to zero (Yes: Step S101). In addition, when the value obtained by adding the value in the error amount storing portion Err(x, y) to the value of the input data vD(x, y) is equal to or larger than 42 and is smaller than 128, the value of the output data VD(x, y) is set to 85 (Yes: Step S102). In addition, when the value obtained by adding the value in the error amount storing portion Err(x, y) to the value of the input data vD(x, y) is equal to or larger than 128 and is smaller than 212, the value of the output data VD(x, y) is set to 170 (Yes: Step S103). On the other hand, when the value obtained by adding the value in the error amount storing portion Err(x, y) to the value of the input data vD(x, y) is not equal to or larger than 128 and not is smaller than 212, the value of the output data VD(x, y) is set to 255 (No: Step S103).

Next, the error diffusion processing will be described with reference to FIG. 5.

After the value of the output data VD(x, y) has been determined, an error ER=vD(x, y)+Err(x, y) VD(x, y) is calculated (Step S104). Next, the error diffusion processing is executed exclusively within the partition 121A (Step S105). Specifically, the amount of error which is to be diffused into the predetermined pixels located in the vicinities of the pixel 112(x, y) is calculated, and the values in the error amount storing portions Err corresponding to the predetermined pixels located in the vicinities of the pixel 112(x, y) are all updated based on the value of the amount of error thus calculated. The details of the processing in Step S105 will be described in detail later with reference to FIG. 6 which will be shown later.

When a relationship of (x+1)≤X is established after completion of the processing in Step S105 (Yes), the value of x is incremented by 1, and the five pieces of processing in and after the processing in Step S101 are repetitively executed. It is noted that "+=" in "x+=1" shown in FIG. 5 is an assignment operator and "x+=1" means "x←x+1."

On the other hand, when a relationship of (x+1)≤X is not established after completion of the processing in Step S105 (No), x=1 is set and also the values of y is incremented by 1 if a relationship of (y+1) Y is established. Then, the five pieces of processing in and after the processing in Step S101 are repetitively executed. It is noted that "+=" in "y+=1" shown in FIG. 5 is the assignment operator described above.

The gradation converting processing for the image of one frame is ended through the operation described above. In the moving image processing, the predetermined pieces of processing are repetitively executed every frame.

Next, a description will be given with respect to an operation of the error diffusion processing executed exclusively within the partition as described above.

FIG. 6A is a schematic top plan view explaining the pixels into which the error is diffused, and weight coefficients of the pixels. FIGS. 6B and 6C are respectively examples of the weight coefficients. That is to say, FIG. 6B shows values of the weight coefficients in the case of a Floyd Steinberg type, and FIG. 6C shows values of the weight coefficients in the case of a Sierra Filter Lite type. Also, FIG. 6D is a schematic top plan view explaining that the error diffusion extending over the partition is not carried out.

As shown in FIG. 6A, in the image display device of the first embodiment, the error ER, in the pixel as an object of the processing, calculated in the processing in Step S104 of FIG. 5 is diffused into the subsequent pixel (the pixel on the right hand side of the pixel containing therein the error ER in the first embodiment) and the three pixels located below the line to which the pixel containing therein the error ER belongs by one line as a rule.

Specifically, a value obtained by multiplying the error ER by the weight coefficient "d" is added to the value in the error amount storing portion Err(x+1, y) corresponding to the pixel 112(x+1, y) next to (on the right hand side) of the pixel 112(x, y) as the object of the processing. Specifically, the processing for obtaining "Err(x+1, y)+=d·ER" is executed. Since "+=" represents the assignment operator described above, a description thereof is omitted here for the sake of simplicity. It is noted that the case of x=X, the processing described above is not executed because the right hand side pixel 112 does not exist.

Likewise, a value obtained by multiplying the error ER by the weight coefficient "a" is added to the value in the error amount storing portion Err(x+1, y+1) corresponding to the bottom right pixel 112(x+1, y+1). Specifically, the processing for obtaining "Err(x+1, y+1)+=a·ER" is executed. It is noted that in the case of either x=X or y=Y, the processing described above is not executed because the right bottom pixel 112 does not exist.

Likewise, a value obtained by multiplying the error ER by the weight coefficient "b" is added to the value in the error amount storing portion Err(x, y+1) corresponding to the pixel 112(x, y+1) located right below the pixel 112(x, y) as the object of the processing. Specifically, the processing for obtaining "Err(x, y+1)+=b·ER" is executed. It is noted that in the case of y=Y, the processing described above is not executed because the pixel 112 located right below the pixel 112(x, y) as the object of the processing does not exist.

Likewise, a value obtained by multiplying the error ER by the weight coefficient "c" is added to the value in the error amount storing portion Err(x 1, y+1) corresponding to the bottom left pixel 112(x 1, y+1). Specifically, the processing for obtaining "Err(x 1, y+1)+=c·ER" is executed. It is noted that in the case of either x=1 or y=Y, the processing described above is not executed because the left bottom pixel 112 does not exist.

It is only necessary to suitably set the values of the weight coefficients "a, b, c, and d" depending on the design of the image display device 1. For example, the values of the weight coefficients "a, b, c, and d" either may be set as shown in FIG. 6B, or may be set as shown in FIG. 6C.

However, the addition of the error amount is not carried out when the pixels 112 as the object of the error diffusion belong to any one(s) of other partitions. This will be concretely described with reference to FIG. 6D. For example, when the errors with respect to the pixels 112 located in the places designated by reference symbols PS1 and PS2, respectively, are diffused, the error diffusion is carried out as a rule. However, when the errors with respect to the pixels 112 located in the places designated by reference symbols PS3 and PS4, respectively, are diffused, the addition of the error amount to each of the left bottom pixels 112 is not carried out because each of the left bottom pixels 112 belongs to another partition. When the errors with respect to the pixels 112 located in the places designated by reference symbols PS5 and PS6, respectively, are diffused, the addition of the error amount to the three pixels located right below by one line is not carried out because the three pixels located right below each of the pixels 112 designated by reference symbols PS5 and PS6, respectively, by one line belong to other partitions. With regard to the pixel 112 located in the place designated by reference symbol PS7, all of the four pixels each becoming the object of the error diffusion processing belong to other partitions, and thus the addition of the error amount with respect to all of the four pixels is not carried out. In addition, when the errors with respect to the pixels 112 located in the places designated by reference symbols PS8 and PS9, respectively, are diffused, the addition of the error amount to the subsequent pixels and the right bottom pixels is not carried out because the subsequent (right hand side) pixels and the right bottom pixels each belong to another partition. The conditions are suitably determined in the error diffusion processing portion 121, thereby making it possible to execute the predetermined pieces of processing described above.

Figure 7:
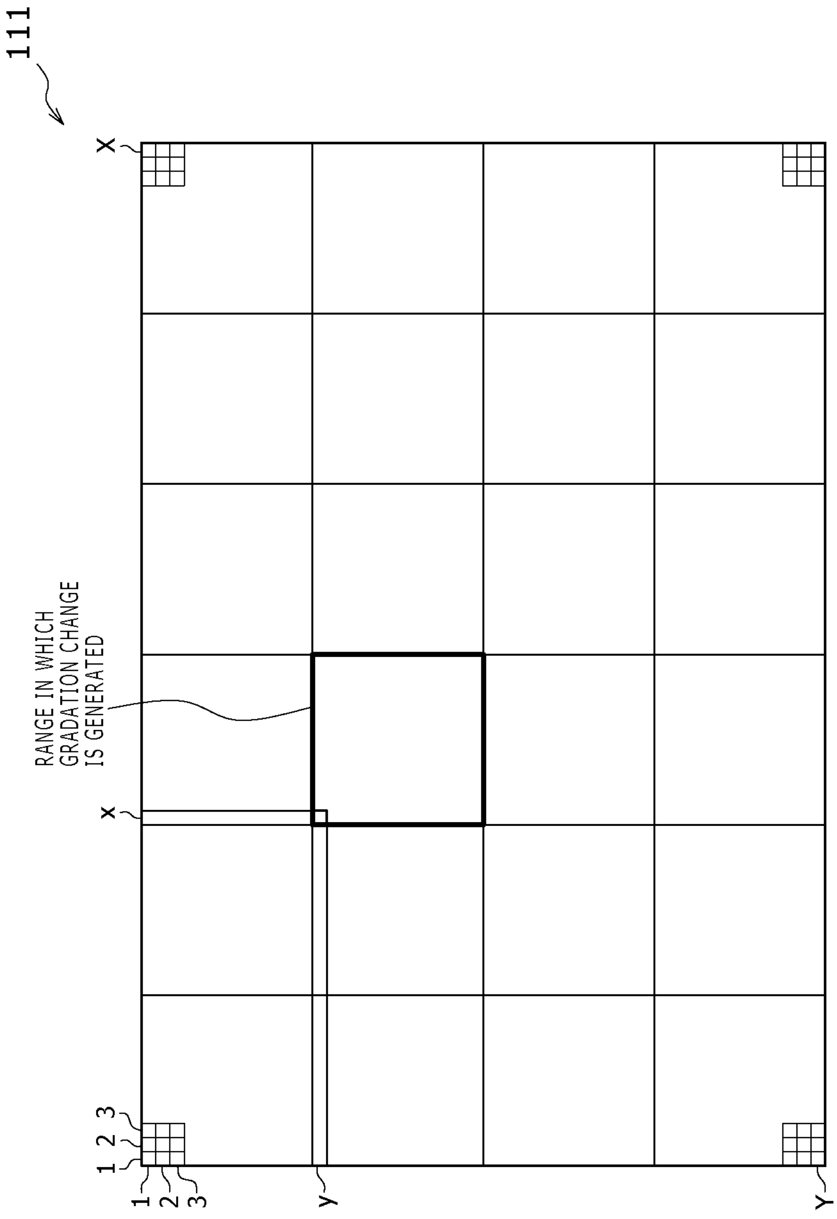
FIG. 7 is a schematic top plan view explaining that when a value of multivalued image data corresponding to certain one pixel is changed, an influence of the error diffusion is fitted within one partition.

FIG. 7 is a schematic top plan view explaining that when the value of the multivalued image data corresponding to certain one pixel is changed, an influence of the error diffusion is fitted within one partition. It is noted that for the sake of convenience of an illustration, in FIG. 7, the illustration of the pixels is omitted except for a part of the pixels.

In the image display device 1 of the first embodiment, when as shown in FIG. 7, the value of the multivalued pixel data corresponding to the pixel 112 located in the x th column and in the y row is changed, the influence of the error diffusion is fitted within the partition 121A to which the pixel 112 belongs. Therefore, when a part of the original image is changed, it is prevented that the change in error diffusion extends over the wide range of the half tone image. As a result, it is possible to lighten the buzzing of the picture when the gradation processing for the moving image is executed.

Although in the example described above, the description has been given with respect to the case where the error is diffused into the pixel 112 next to the pixel 112 as the object of the processing, and the three pixels located right below the pixel 112 as the object of the processing by one line, that is, the four pixels in total, the pixels each becoming the object of the error diffusion are by no means limited thereto. For example, as shown in FIGS. 8A and 8B, a constitution may also be adopted such that the error is diffused into the two pixels next to the pixel as the object of the processing, the five pixels located below the pixel as the object of the processing by one line, and the five pixels located below the pixel as the object of the processing by two lines, that is, the 12 pixels in total. Or, as shown in FIG. 8C, a constitution may also be adopted such that the error is diffused into the two pixels next to the pixel as the object of the processing, and the five pixels located below the pixel as the object of the processing by one line, that is, the 7 pixels in total. It is noted that the values of the weight coefficients shown in FIGS. 8A to 8C are merely exemplified, and thus it is possible to suitably set the weight coefficients depending on the design of the image display device 1.

The image display program includes: being executed in the image display device 1 including the display block 110 for displaying thereon an image by using the pixels 112 disposed in the two dimensional matrix, and the gradation converting block 120 for executing the gradation converting processing by using the error diffusion method; partitioning the area in which the pixels 112 are disposed into the virtual partitions 121A by the execution; and carrying out the error diffusion when the gradation converting processing is executed with respect to the pixels 112 within the virtual partition 121A exclusively within the virtual partition 121A by the execution, thereby carrying out gradation conversion for the image which is displayed on the display block 110.

In addition, although in the above description, the display block 110 is made to be adapted to the monochrome display, the display block 110 can also be made to be adapted to the color display. In this case, all it takes is that the gradation converting processing described above is executed every kind of sub pixel.

Figure 9:
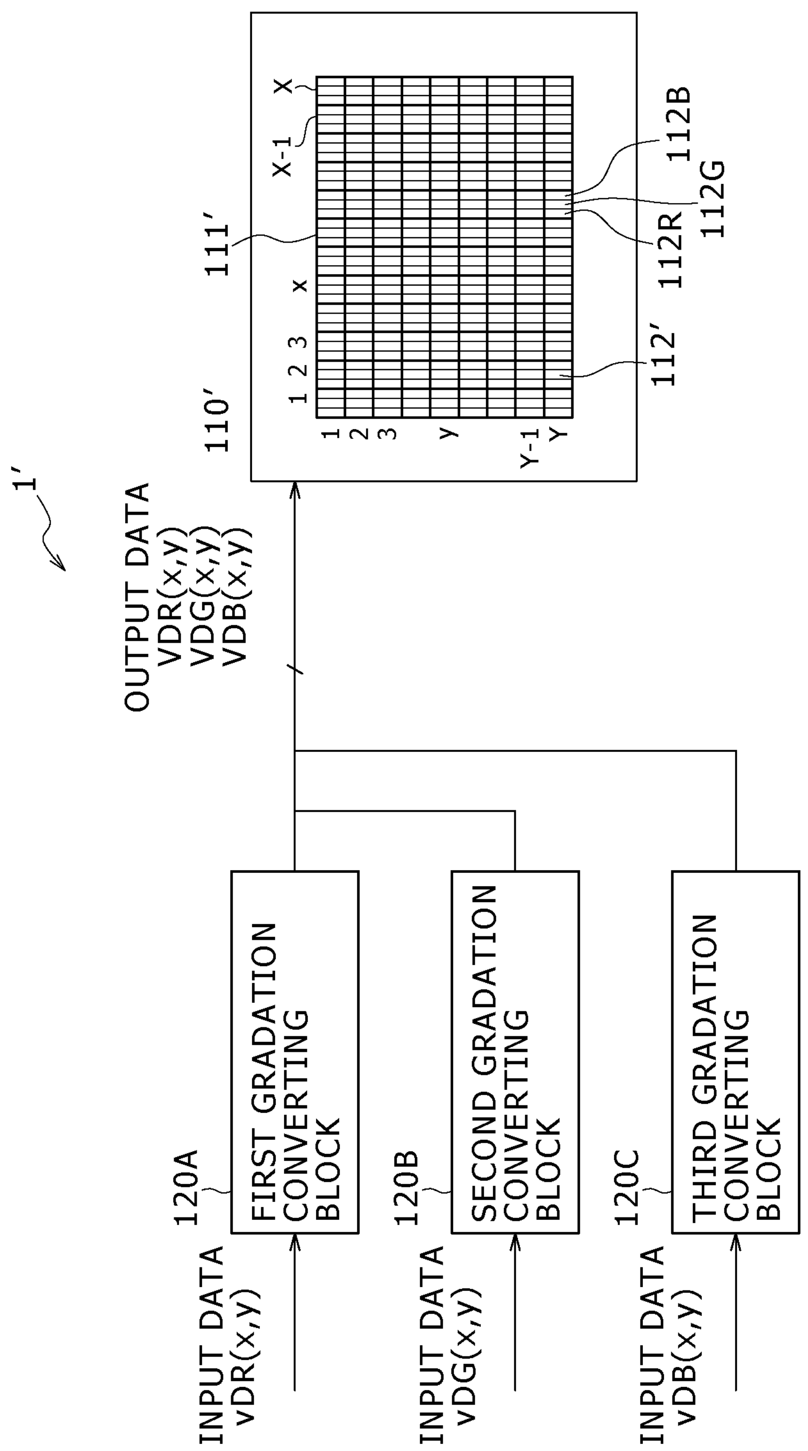
FIG. 9 is a conceptual view of the image display device when a display block is made to be adapted to color display.

FIG. 9 is a conceptual view of an image display device when a display block is made to be adapted to the color display.

The image display device 1' includes a first gradation converting block 120A, a second gradation converting block 120B, and a third gradation converting block 120C. Each of the first gradation converting block 120A, the second gradation converting block 120B, and the third gradation converting block 120C has the same configuration as that of the gradation converting block 120 shown in FIG. 1. A pixel 112' composing the display block 110' is composed of a set of red light emitting sub pixel 112R, green light emitting sub pixel 112G, and blue light emitting sub pixel 112B. The pixels 112' are disposed in a tow dimensional matrix in a display area 111'. The first gradation converting block 120A carries out the same operation as that described above with reference to the input data vDR(x, y) for the red color display. The second gradation converting block 120B carries out the same operation as that described above with reference to the input data vDG(x, y) for the green color display. Also, the third gradation converting block 120C carries out the same operation as that described above with reference to the input data vDB(x, y) for the blue color display. In addition, the image for which the gradation conversion is carried out is displayed on the display block 110' in accordance with the three pieces of output data VDR(x, y), VDG(x, y), and VDB(x, y) each of which is subjected to the gradation conversion.

Second Embodiment

A second embodiment is substantially a change of the first embodiment. In the image display device 1 of the first embodiment, since the error is diffused exclusively within the partition, the gradation unevenness is visually recognized in the vicinities of the boundary in some cases. In order to cope with such a situation, in an image display device of the second embodiment, a gradation converting block partitions the area in which the pixels are disposed into plural virtual partitions, and selects a result of the gradation converting processing in the area which is the area within the partitions and which does not include any of the pixels in the vicinities of the boundary, thereby carrying out the gradation conversion for the image which is displayed on the display block. This point is mainly different from the image display device 1 of the first embodiment. According to the image display device of the second embodiment, it is possible to lighten the gradation unevenness in the vicinities of the boundary.

Figure 10:
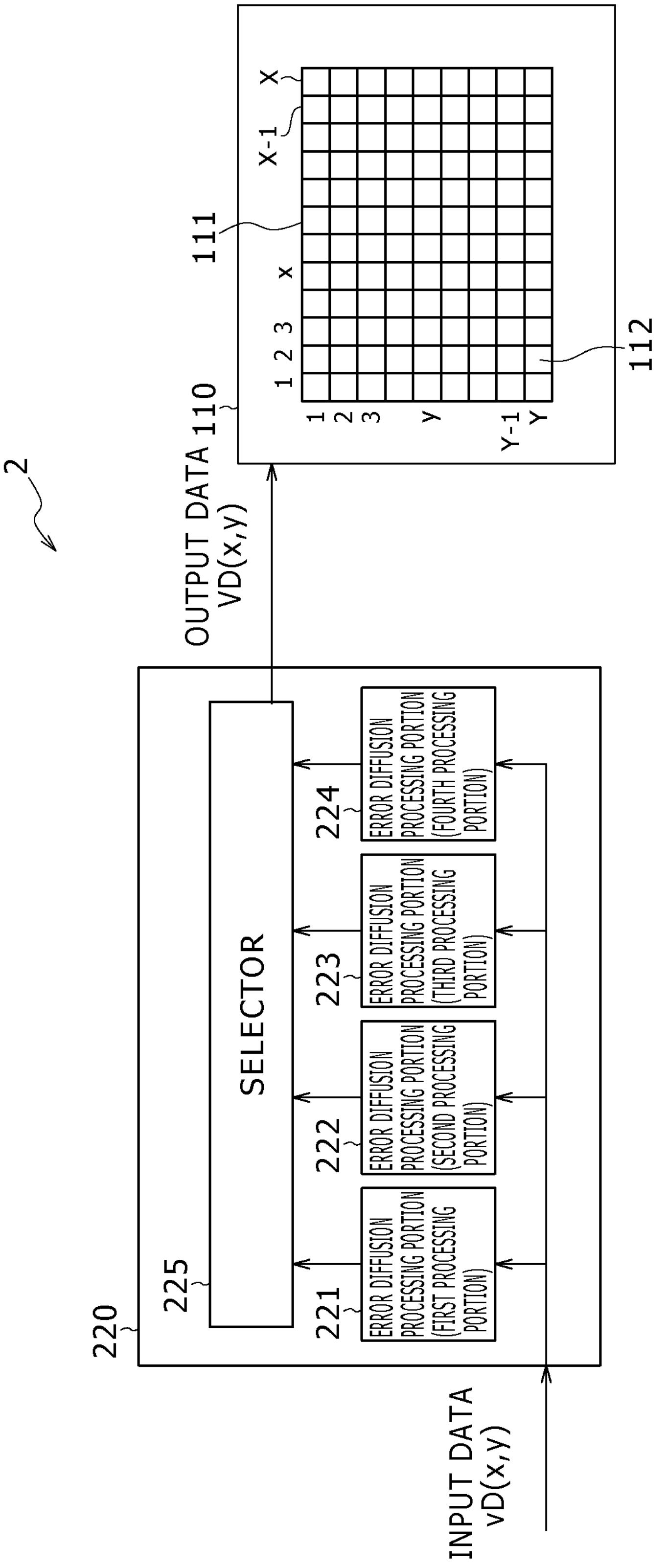
FIG. 10 is a conceptual diagram showing a configuration of an image display device according to a second embodiment of the present disclosure.

FIG. 10 is a conceptual diagram of the image display device according to the second embodiment of the present disclosure.

The image display device 2 of the second embodiment also includes the display block 110 and a gradation converting block (gradation converter) 220. In this case, the display block 110 displays thereon the image by using the pixels 112 disposed in the two dimensional matrix. Also, the gradation converting block (gradation converter) 220 executes the gradation converting processing by using the error diffusion method.

Since the display block 110 has the same configuration as that of the display block 110 described in the image display device 1 of the first embodiment, a description thereof is omitted here for the sake of simplicity.

The gradation converting block 220 includes error diffusion processing portions 221, 222, 223, and 224, and a selector 225. In this case, each of the error diffusion processing portions 221, 222, 223, and 224 executes the gradation processing by using the error diffusion method. Also, the selector 225 selects the result from the results of the four pieces of gradation converting processing executed in the error diffusion processing portions 221, 222, 223, and 224, respectively.

Hereinafter, for the sake of convenience of a description, the error diffusion processing portions 221, 222, 223, and 224 will be referred to as a first processing portion 221, a second processing portion 222, a third processing portion 223, and a fourth processing portion 224, respectively.

An outline of the image display device 2 of the second embodiment will now be described. Input data vD corresponding to the pixels 112 is inputted to each of the first processing portion 221, the second processing portion 222, the third processing portion 223, and the fourth processing portion 224.

The first processing portion 221 composing the gradation converting block 220 partitions the area in which the pixels 112 are disposed into virtual partitions 221A shown in FIG. 17 which will be described later, and carries out the error diffusion when the gradation converting processing is executed with respect to the pixels 112 within the virtual partition 221A exclusively within the virtual partition 221A. In addition, the second processing portion 222 composing the gradation converting block 220 partitions the area in which the pixels 112 are disposed into virtual partitions 222A shown in FIG. 18 which will be described later, and carries out the error diffusion when the gradation converting processing is executed with respect to the pixels 112 within the virtual partition 222A exclusively within the virtual partition 222A.

Figure 19:
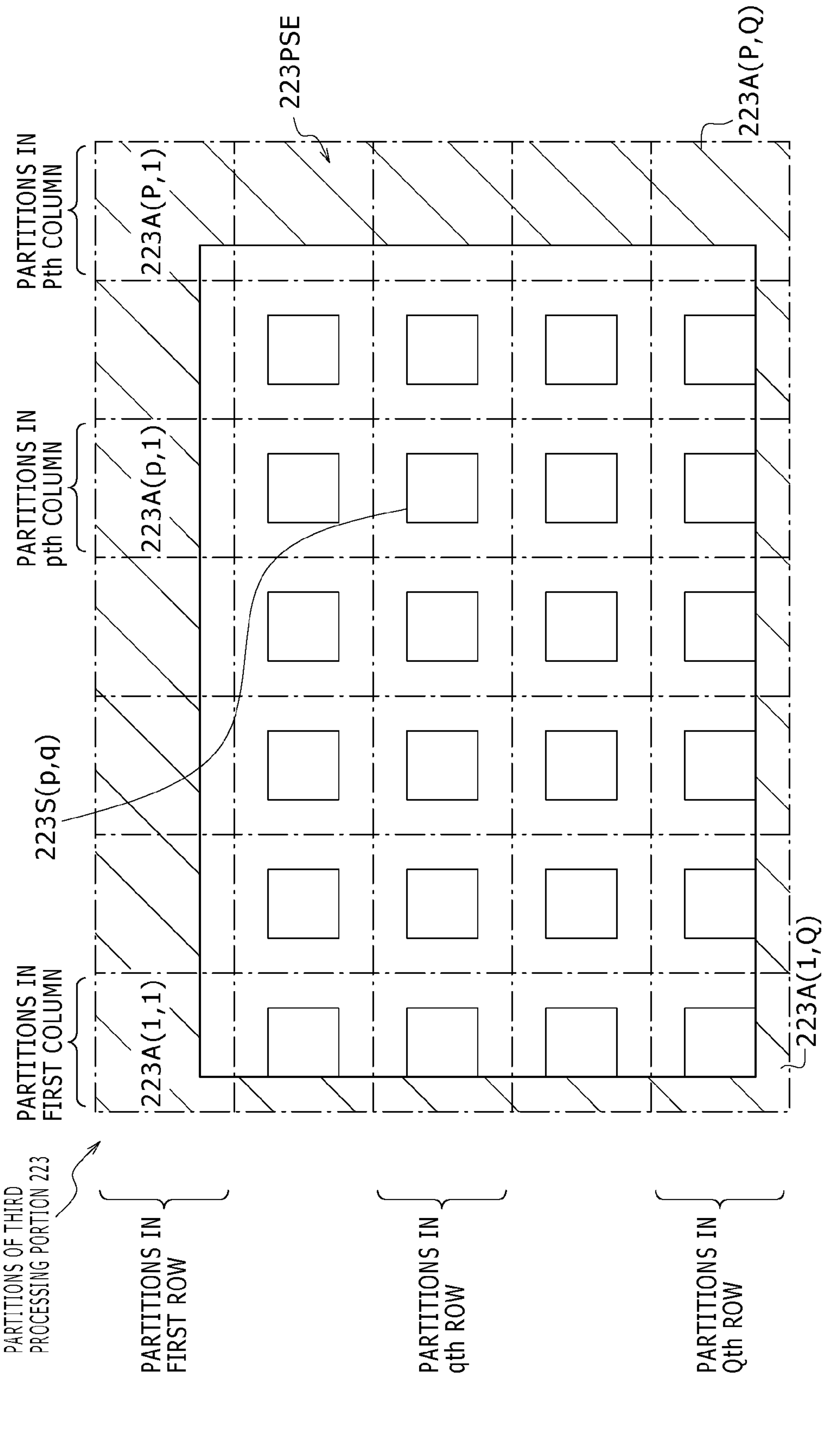
FIG. 19 is a top plan view explaining an area in which when the gradation processing is executed by the third processing portion, a value of output data for which the gradation processing is executed is selected by the selector.

The third processing portion 223 composing the gradation converting block 220 partitions the area in which the pixels 112 are disposed into virtual partitions 223A shown in FIG. 19 which will be described later, and carries out the error diffusion when the gradation converting processing is executed with respect to the pixels 112 within the virtual partition 223A exclusively within the virtual partition 223A. In addition, the fourth processing portion 224 composing the gradation converting block 220 partitions the area in which the pixels 112 are disposed into virtual partitions 224A shown in FIG. 20 which will be described later, and carries out the error diffusion when the gradation converting processing is executed with respect to the pixels 112 within the virtual partition 224A exclusively within the virtual partition 224A.

Also, the selector 225 selects the result, of the predetermined gradation converting processing, of the results of the four pieces of gradation converting processing executed in the first to fourth processing portions 221 to 224, respectively. Also, the selector 225 outputs the result thus selected as the output data VD to the display block 110.

Hereinafter, the image display device 2 of the second embodiment will be described in detail.

Figure 11:
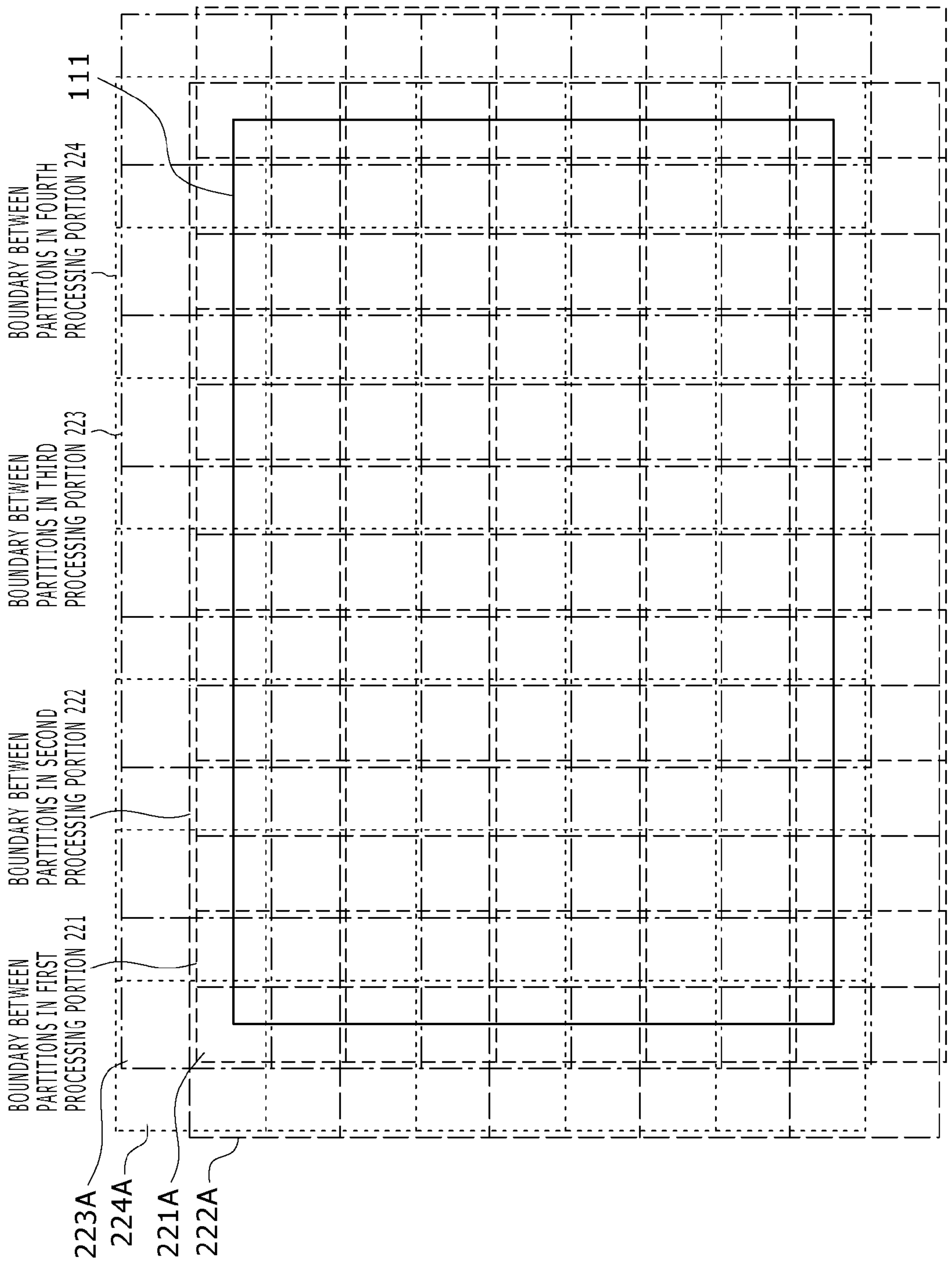
FIG. 11 is a schematic top plan view explaining a relationship between a display area, and partitions within which a first processing portion, a second processing portion, a third processing portion, and a fourth processing portion execute predetermined pieces of gradation processing, respectively.
Figure 12:
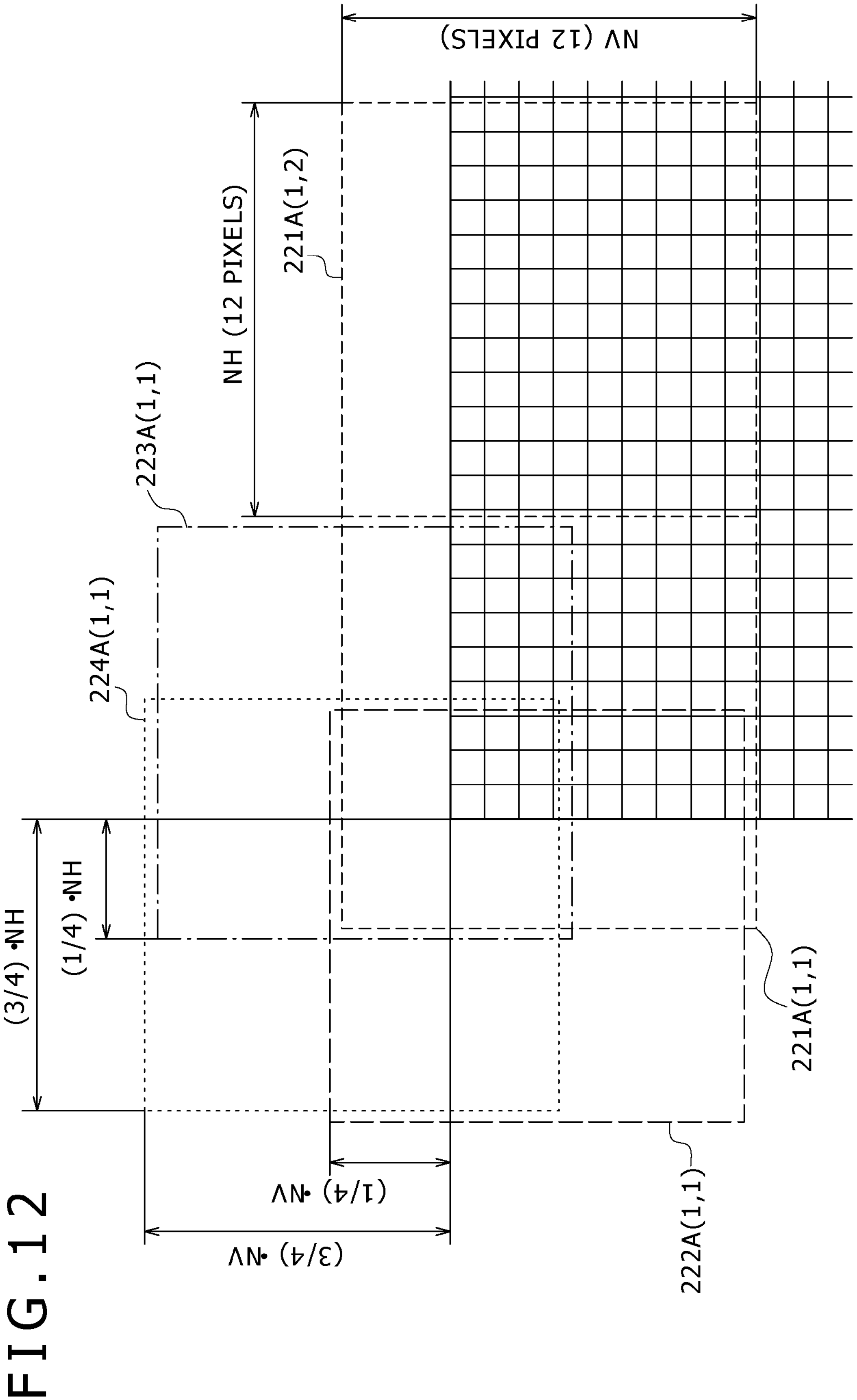
FIG. 12 is a schematic top plan view explaining a relationship among a (1, 1) th partition 221A(1, 1) of the first processing portion, a (1, 1) th partition 222A(1, 1) of the second processing portion, a (1, 1) th partition 223A(1, 1) of the third processing portion, and a (1, 1) th partition 224A(1, 1) of the fourth processing portion at the top left end of the display area.

FIG. 11 is a schematic top plan view explaining a relationship between the display area, and the partitions within which the first processing portion, the second processing portion, the third processing portion, and the fourth processing portion execute the respective pieces of gradation processing. FIG. 12 is a schematic top plan view explaining a relationship among the (1, 1) th partition 221A(1, 1) of the first processing portion, the (1, 1) th partition 222A(1, 1) of the second processing portion, the (1, 1) th partition 223A(1, 1) of the third processing portion, and the (1, 1) th partition 224A(1, 1) of the fourth processing portion. For the sake of convenience of an illustration, the illustration of the pixels 112 is omitted in FIG. 11. In addition, in FIGS. 11 and 12, the portions 221A, 222A, 223A, and 224A are shown in the shifting manner for descriptive purposes in such a way that the boundary between each adjacent two partitions does not overlap any of other lines.

In FIGS. 11 and 12, the boundary between each adjacent two partitions 221A of the first processing portion 221 is indicated by a short broken line, and the boundary between each adjacent two partitions 222A of the second processing portion 222 is indicated by a long broken line. Also, the boundary between each adjacent two partitions 223A of the third processing portion 223 is indicated by a chain line, and the boundary between each adjacent two partitions 224A of the fourth processing portion 224 is indicated by a dotted line.

In the image display device 2 as well of the second embodiment, each of the partitions 221A, 222A, 223A, and 224A has the rectangular shape similarly to the case of the partition 121A in the image display device 1 of the first embodiment. 12 pixels 112 in the row direction, and 12 pixels 112 in the column direction, that is, (12×12) pixels 112 in total correspond to one partition similarly to the case described with respect to the partition 121A in the image display device 1 of the first embodiment.

However, unlike the case of the partitions 121A described in the image display device 1 of the first embodiment, as shown in FIG. 12, the partitions 221A, 222A, 223A, and 2224A are set so as to be shifted by predetermined amounts, respectively, with respect to the display area 111. When a horizontal width and a vertical width of the partition are expressed by reference symbols NH and NV, respectively, the partition 221A(1, 1) is shifted by (1 4)×NV in an upper direction, and by (1 4)×NH in a left hand direction. In addition, the partition 222A(1, 1) is shifted by (1 4)×NV in the upper direction, and by (3 4)×NH in the left hand direction. The partition 223A(1, 1) is shifted by (3 4)×NV in the upper direction, and by (1 4)×NH in the left hand direction. Also, the partition 224A(1, 1) is shifted by (3 4)×NV in the upper direction, and by (3 4)×NH in the left hand direction.

Figure 13:
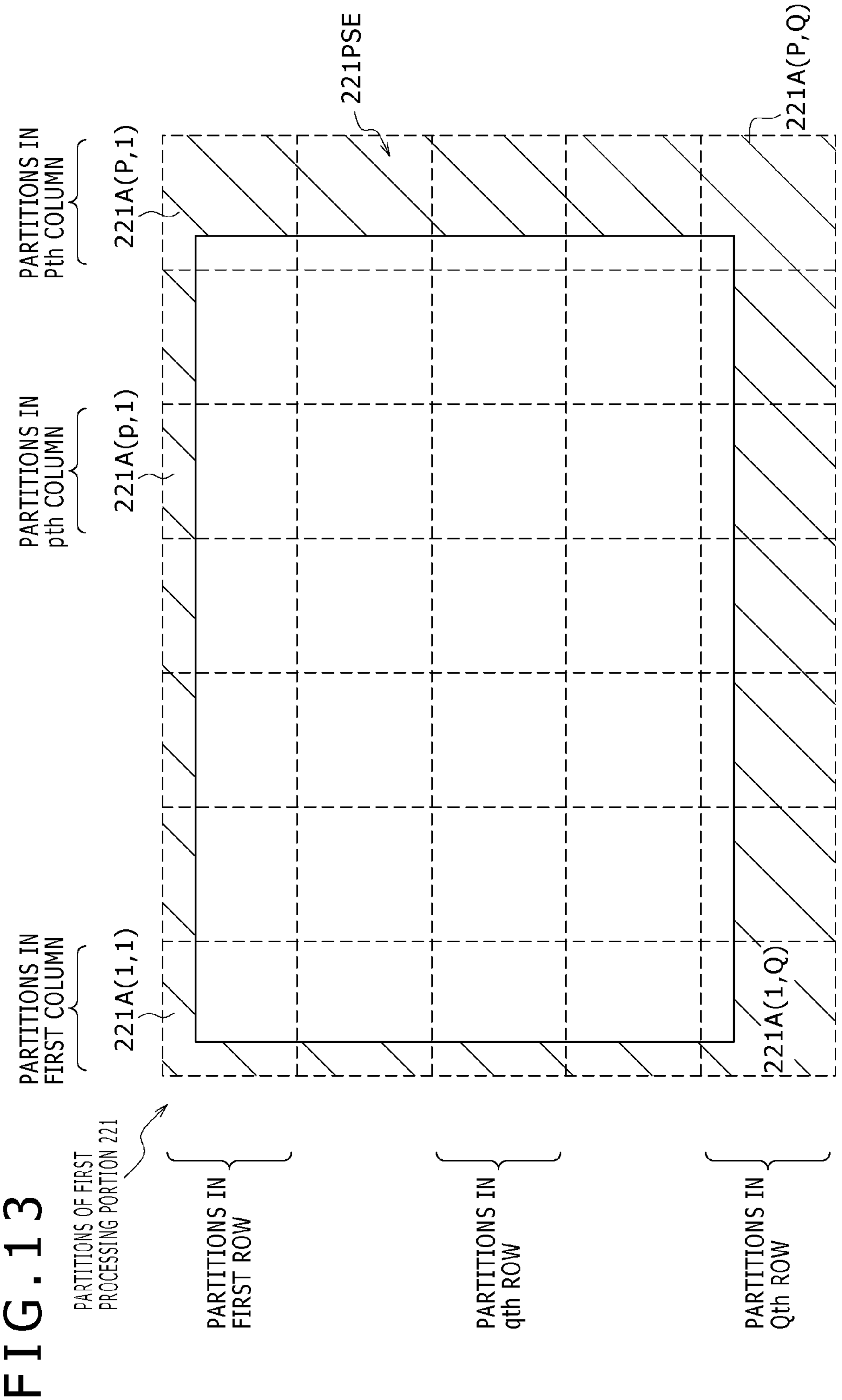
FIG. 13 is a schematic top plan view explaining a relationship between the display area and the partition of the first processing portion.

FIG. 13 is a schematic top plan view explaining a relationship between the display area, and the partitions of the first processing portion.

As described above, the partitions 221A, 222A, 223A, and 2224A are set so as to be shifted by the predetermined amounts, respectively, with respect to the display area 111. Therefore, each of the numbers of rows, and each of the numbers of columns in each of the partitions 221A, 222A, 223A, and 224A have values obtained by adding 1 to the number of rows, and the number of columns in the partition 121A of the image display device 1 of the first embodiment, respectively, so as to perfectly cover the display area 111. Therefore, a relationship of P=(X 12)+1, and Q=(Y 12)+1 is obtained. An area 221PSE indicated by slant lines is an area in which any of corresponding pixels 112 does not exist although it falls within the partition. It is noted that this also applies to each of an area 222PSE in FIG. 18, an area 223PSE in FIG. 19, and an area 224PSE in FIG. 20.

Figure 14:
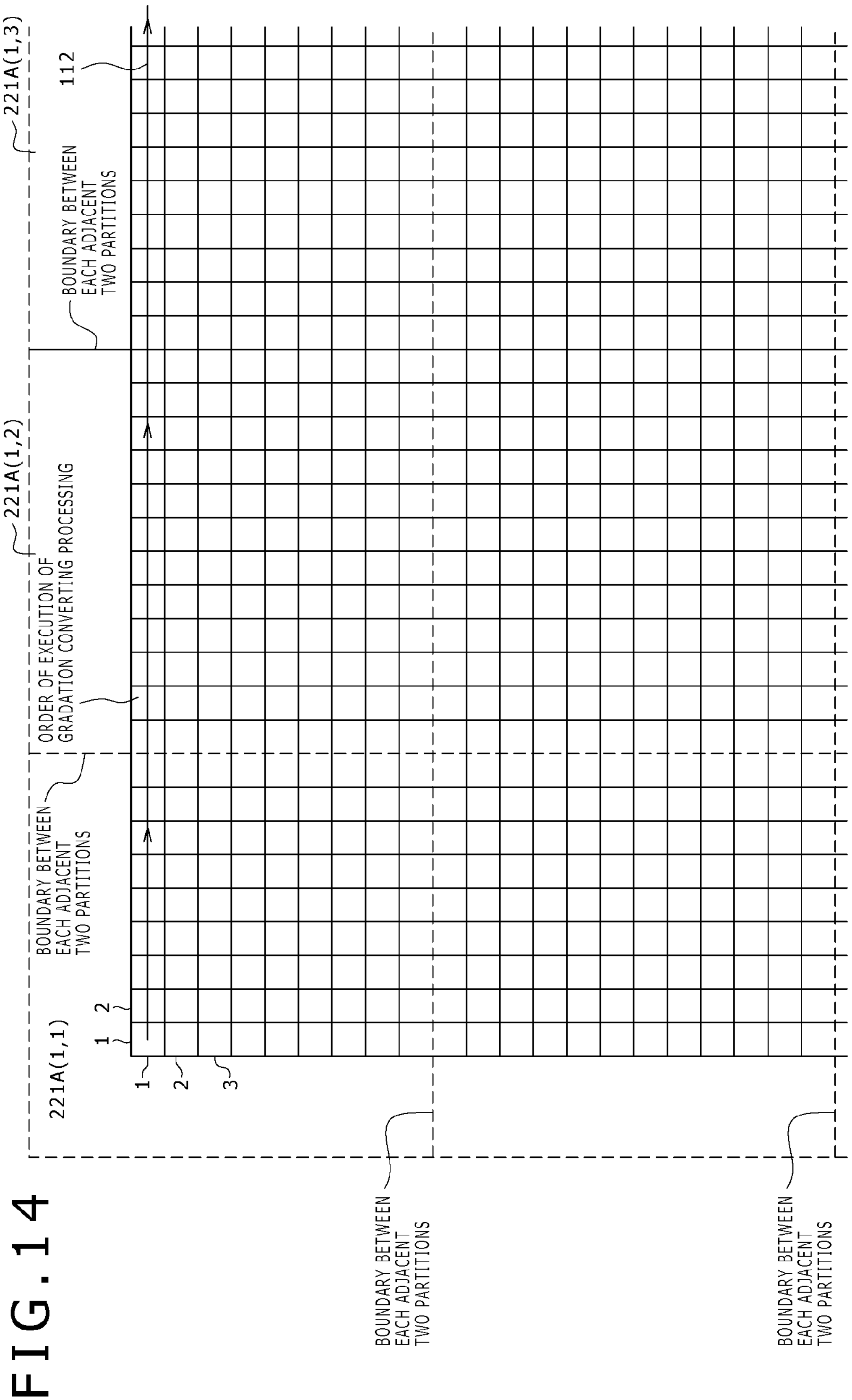
FIG. 14 is a schematic top plan view explaining the gradation processing executed by the first processing portion.
Figure 15:
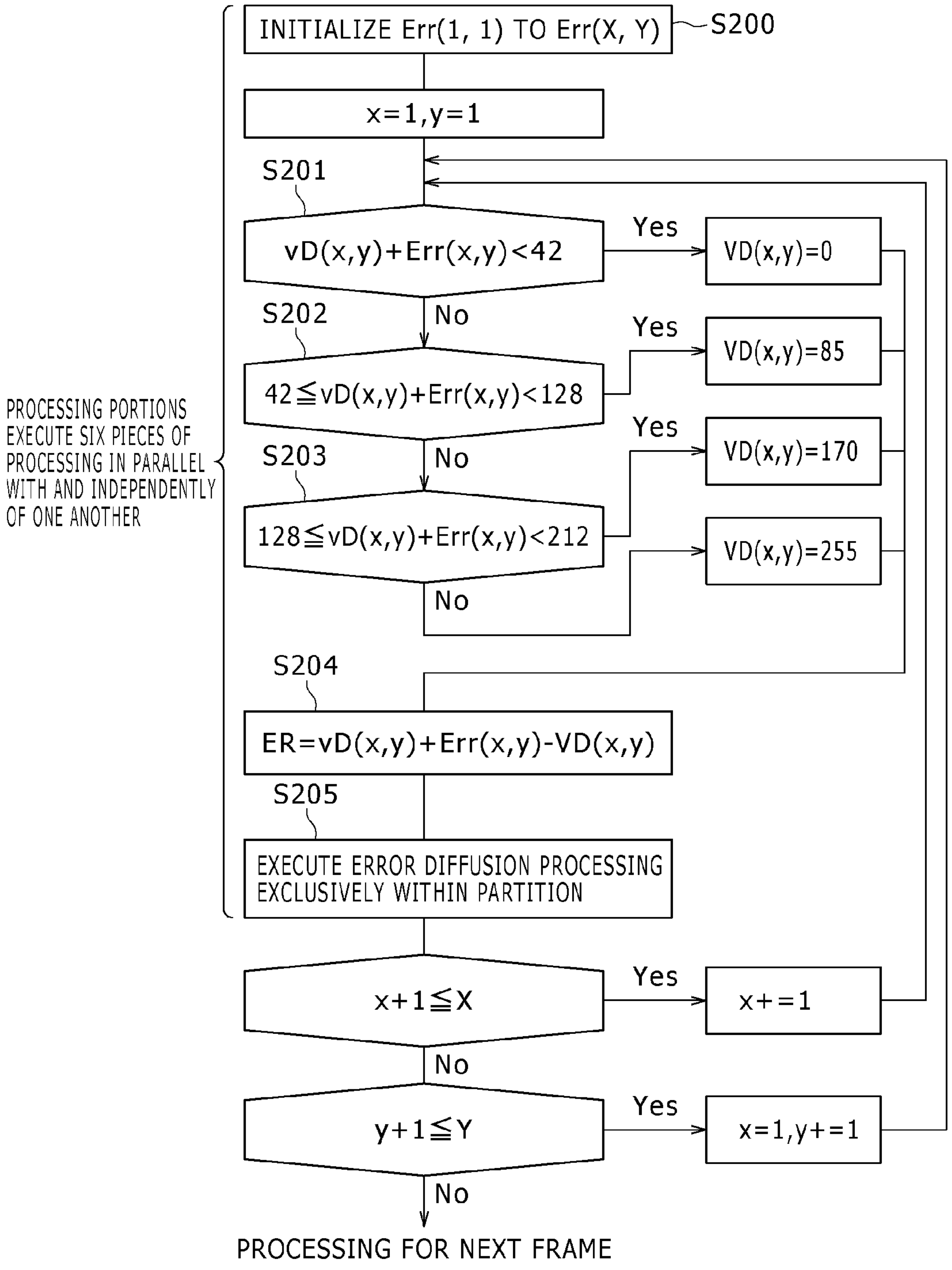
FIG. 15 is a flow chart explaining an operation of the predetermined pieces of gradation processing executed by the first processing portion, the second processing portion, the third processing portion, and the fourth processing portion, respectively.

FIG. 14 is a schematic top plan view explaining the gradation processing executed by the first processing portion. FIG. 15 is a flow chart explaining an operation of the four pieces of gradation processing executed in the first processing portion, the second processing portion, the third processing portion, and the fourth processing portion, respectively.

Similarly to the case of the image display device 1 of the first embodiment, the (X×Y) pieces of input data vD(1, 1) to vD(X, Y) are successively supplied to the gradation converting block 220 every display frame. Therefore, the first processing portion 221 firstly executes the gradation converting processing for the input data vD(1, 1) corresponding to the pixel 112(1, 1) included in the partition 221A(1, 1), and the processing for diffusing the error into corresponding ones of other pixels 112. Next, the first processing portion 221 successively executes the predetermined pieces of gradation converting processing for the (X 1) pieces of input data vD corresponding to the right hand pixels, respectively, and the predetermined pieces of processing for diffusing the errors into corresponding ones of other pixels 112. Also, similarly to the case described in the image display device 1 of the first embodiment, the addition of the error is not carried out when the pixel becoming the object of the error diffusion belongs to another partition. Since the concrete operation is the same as that described in the image display device 1 of the first embodiment, a description thereof is omitted here for the sake of simplicity.

The second processing portion 222, the third processing portion 223, and the fourth processing portion 224 also execute the respective pieces of gradation converting processing for the predetermined pieces of input data vD, and the respective pieces of processing for diffusing the errors into corresponding ones of other pixels 112 independently of one another. A description of the flow chart shown in FIG. 15 is the same as that given with respect to FIG. 5 in the image display device 1 of the first embodiment. Since six pieces of processing from Step S200 to S205 are the same as those from Step S100 to S105 shown in FIG. 5, a description thereof is omitted here for the sake of simplicity. Each of the first to fourth processing portions 221 to 224 include a buffer (not shown) and the like. Thus, the first to fourth processing portions 221 to 224 execute the five pieces of processing from Step S201 to S205 shown in FIG. 15 in parallel with and independently of one another in such a way that the operation of a certain processing portion does not exert an influence on any of the operations of other processing portions.

Figure 16:
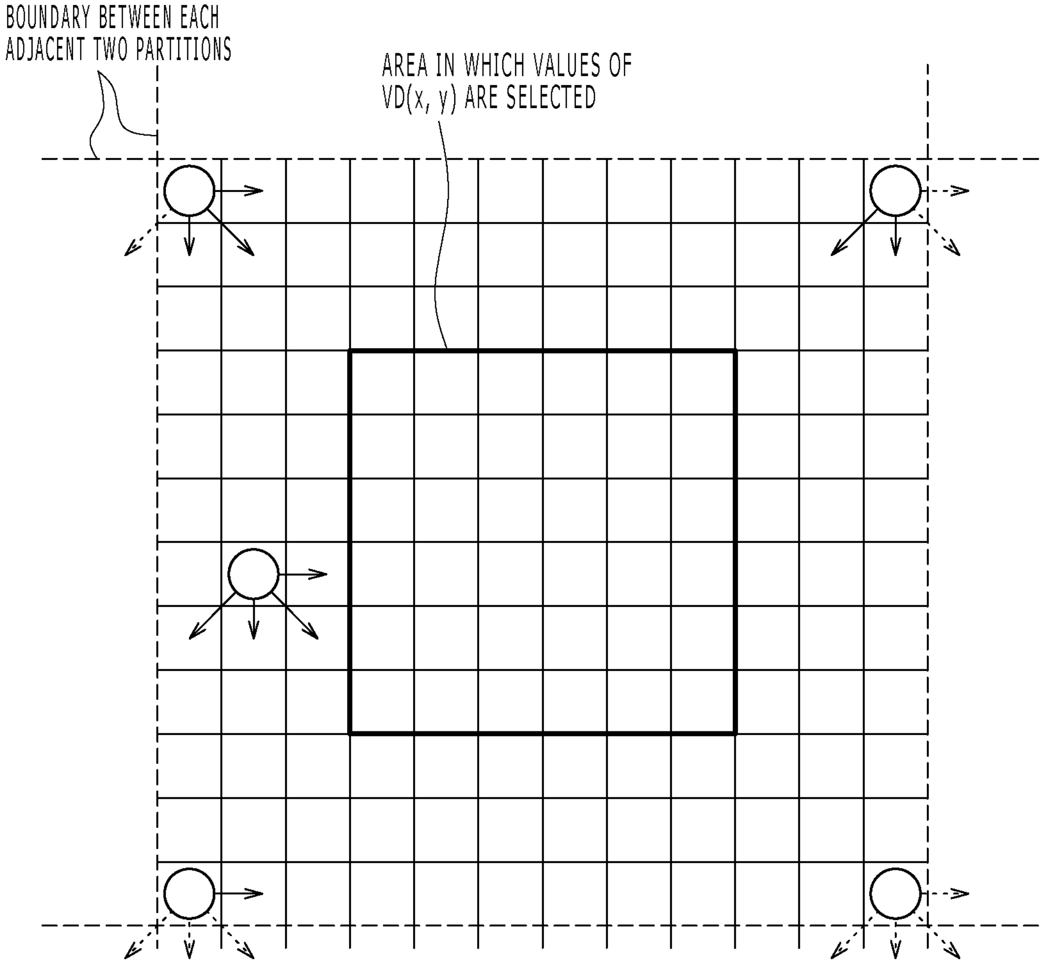
FIG. 16 is a schematic top plan view explaining an area which does not include any of the pixels located in the vicinity of a boundary between each adjacent two partitions.

FIG. 16 is a schematic top plan view explaining the area which does not include any of the pixels located in the vicinities of the boundary between each adjacent two partitions.

The selector 225 shown in FIG. 10 selects the result, of the gradation converting processing when the input data vD(x, y) corresponds to the pixels 112 within the area in which the input data vD(x, y) does not contain any of the pixels located in the vicinities of the boundary between each adjacent two partitions (the area surrounded by a solid line in FIG. 16), from the results of the four pieces of gradation converting processing executed with respect to the input data vD(x, y) by the first processing portion, the second processing portion, the third processing portion, and the fourth processing portion, respectively. Also, the selector 225 supplies the result thus selected as the output data to the display block 110. The conditions are suitably determined in the selector 225, thereby making it possible to execute the selecting processing described above.

In the image display device 2 of the second embodiment, the area which does not include any of the pixels located in the vicinities of the boundary between each adjacent two partitions is the area except for the pixels 112 for the three rows and the pixels 112 for the three columns which are disposed side by side adjacent to the boundary between each adjacent two partitions. A shape of that area is a rectangular and tessellating pattern corresponding to the (6×6) pixels.

Figure 17:
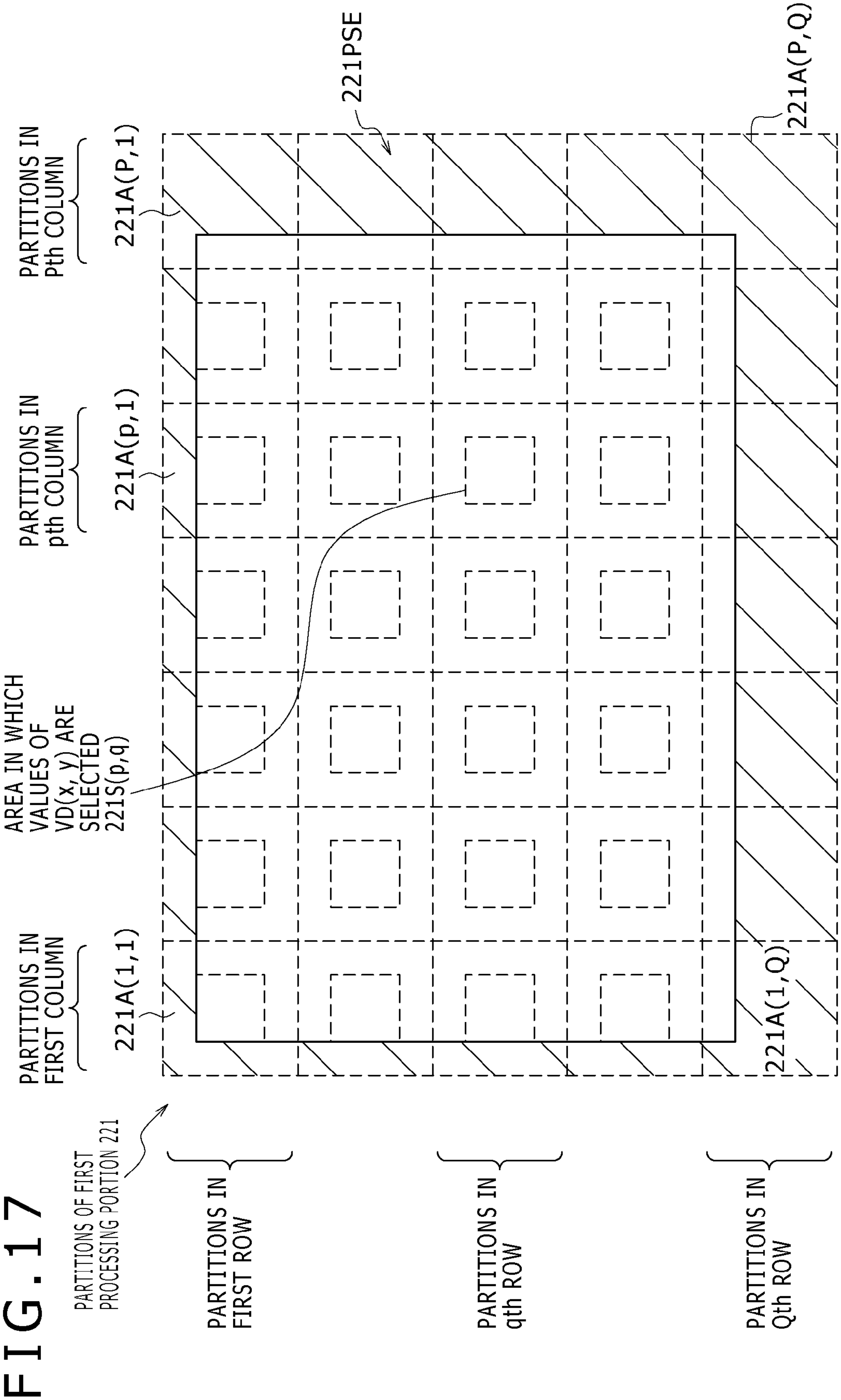
FIG. 17 is a top plan view explaining an area in which when the gradation processing is executed by the first processing portion, a value of output data for which the gradation processing is executed is selected by a selector.

FIG. 17 is a schematic top plan view explaining the area within which the result of the gradation converting processing is selected by the selector when the gradation processing is executed by the first processing portion.

In FIG. 17, the area within which in the partition 221A(p, q), the result of the gradation converting processing is selected by the selector 225 is expressed by reference symbol 221S(p, q).

Figure 18:
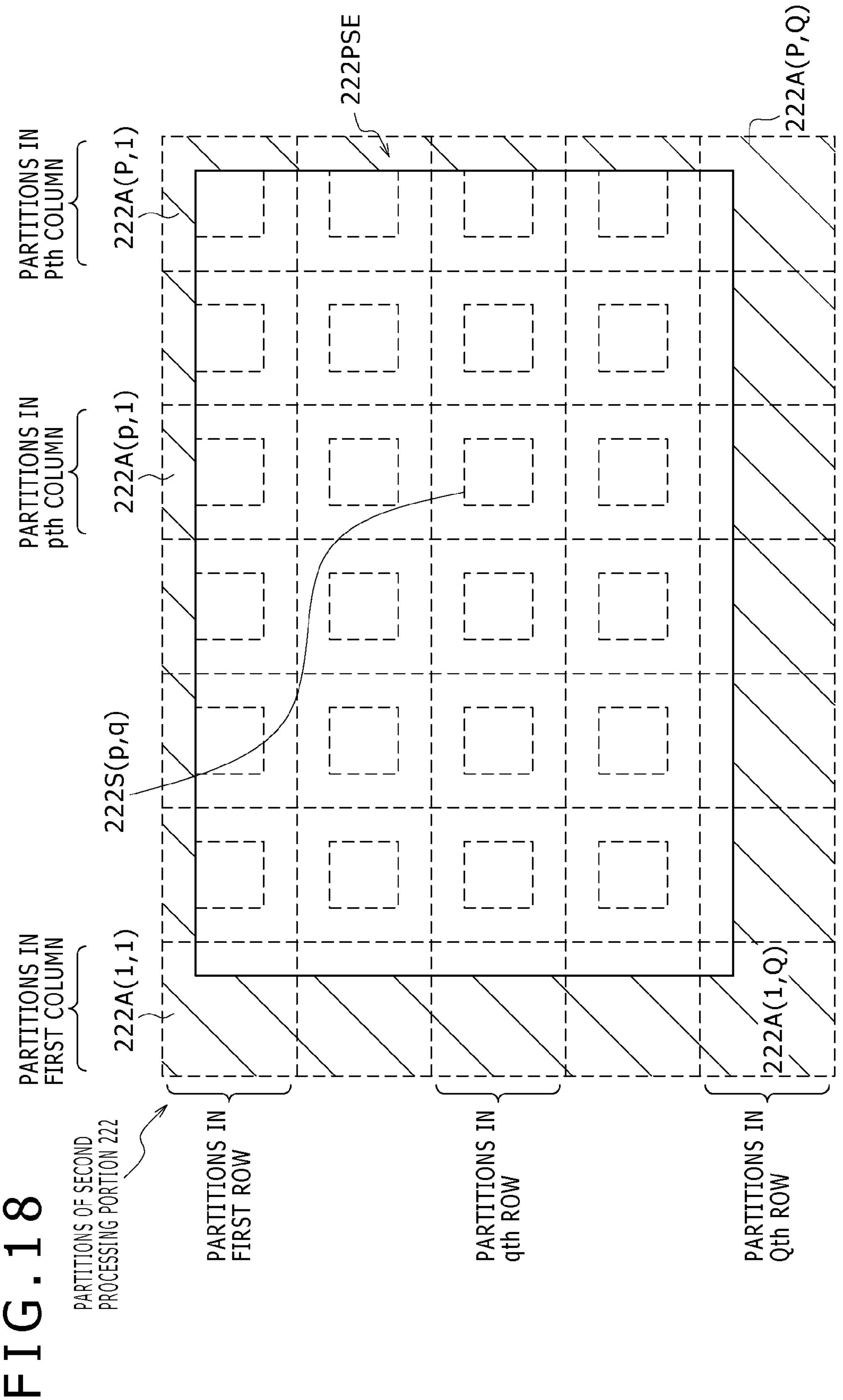
FIG. 18 is a top plan view explaining an area in which when the gradation processing is executed by the second processing portion, a value of output data for which the gradation processing is executed is selected by the selector.
Figure 20:
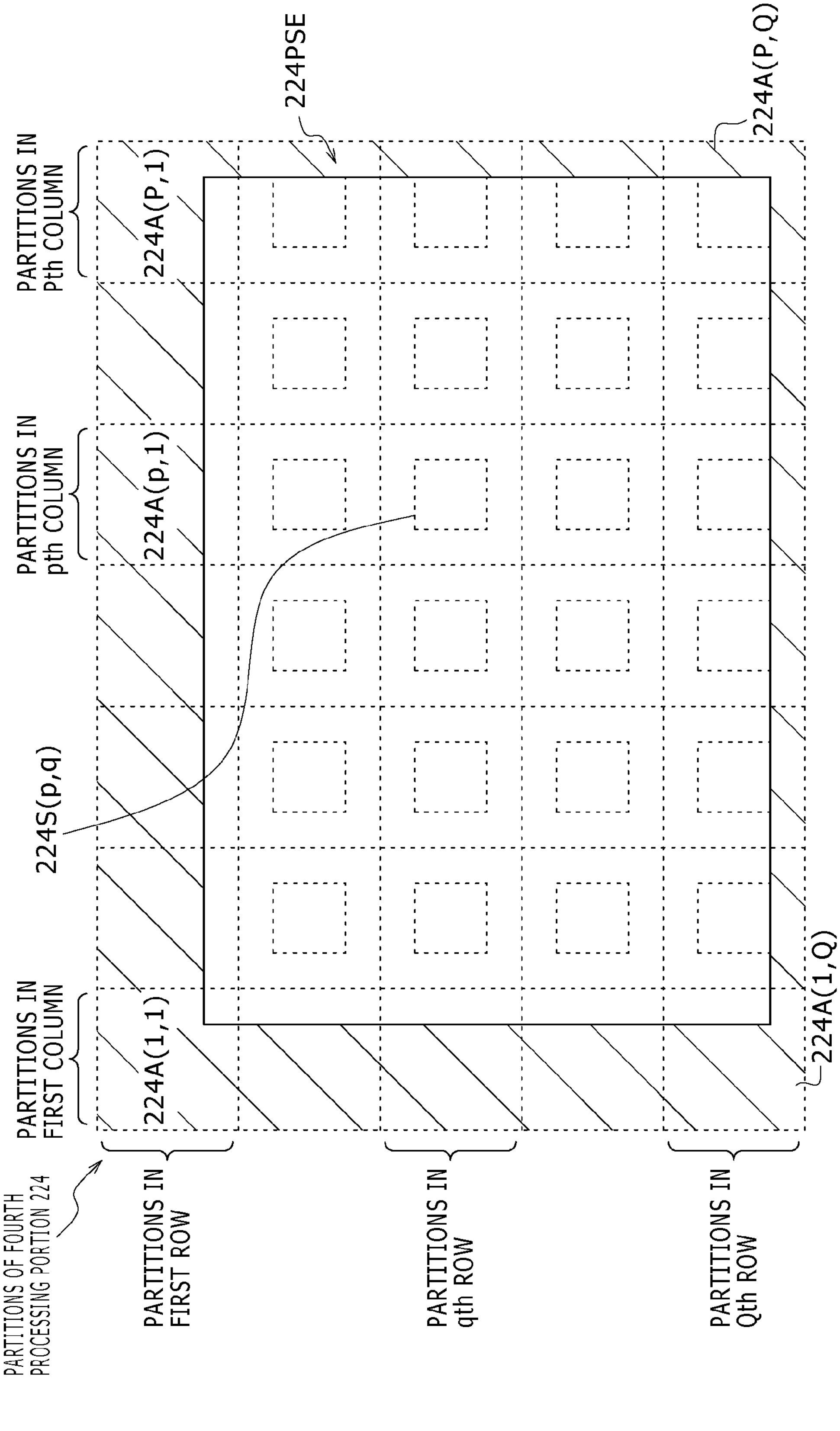
FIG. 20 is a top plan view explaining an area in which when the gradation processing is executed by the fourth processing portion, a value of output data for which the gradation processing is executed is selected by the selector.

FIG. 18 is a schematic top plan view explaining the area within which the result of the gradation converting processing is selected by the selector when the gradation processing is executed by the second processing portion. FIG. 19 is a schematic top plan view explaining the area within which the result of the gradation converting processing is selected by the selector when the gradation processing is executed by the third processing portion. Also, FIG. 20 is a schematic top plan view explaining the area within which the result of the gradation converting processing is selected by the selector when the gradation processing is executed by the fourth processing portion.

In FIG. 18, the area within which in the partition 222A(p, q), the result of the gradation converting processing is selected by the selector 225 is expressed by reference symbol 222S(p, q). Likewise, in FIG. 19, the area within which in the partition 223A(p, q), the result of the gradation converting processing is selected by the selector 225 is expressed by reference symbol 223S(p, q). Also, in FIG. 20, the area within which in the partition 224A(p, q), the result of the gradation converting processing is selected by the selector 225 is expressed by reference symbol 224S(p, q).

Figure 21:
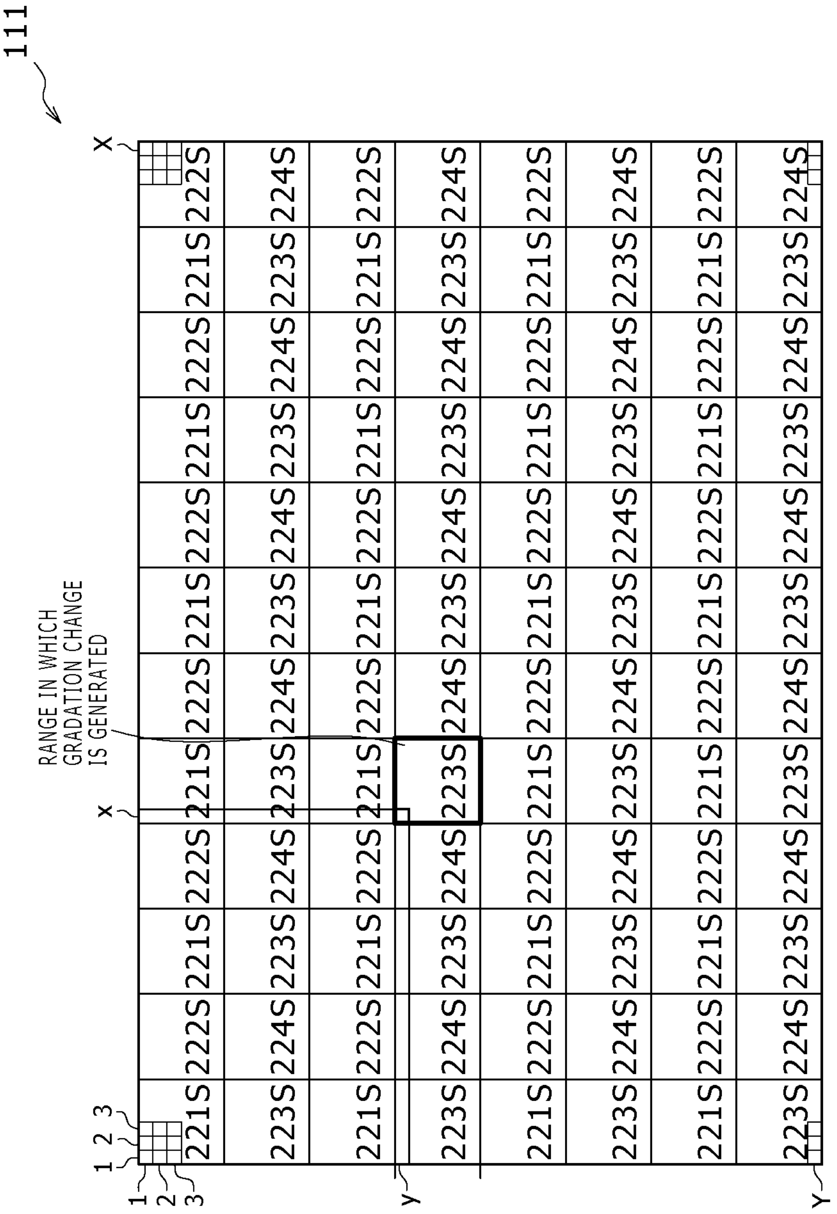
FIG. 21 is a schematic top plan view explaining a range in which a change in gradation can be generated due to an influence of the error diffusion when a luminance of one pixel is changed in the image display device according to the second embodiment of the present disclosure.

FIG. 21 is a schematic top plan view explaining a range in which a change in gradation can be generated due to the influence of the error diffusion when the luminance of one pixel is changed in the image display device of the second embodiment. It is noted that for the sake of convenience of an illustration, in FIG. 21, the illustration of the pixels is omitted except for a part of the pixels.

In the image display device 2 of the second embodiment, as shown in FIG. 21, for example, when the pixel 112 located in the x th column and in the y th row is included in the area 223S, the influence of the error diffusion when the value of the input data of the pixel 112 concerned is changed stays in the area 223S in the partition 223A to which the pixel 112 concerned belongs. Therefore, it is prevented that when a part of the original image is changed, the change in error diffusion extends over the wide range of the half tone image. In addition, since the result of the gradation converting processing in the vicinities of the boundary is not used, the luminance unevenness corresponding to the boundary is also prevented from being conspicuous.

In addition, although in the above description, the display block 110 is made to be adapted to the monochrome display, the display block 110 can also be made to be adapted to the color display. In this case, it is only necessary to execute the gradation converting processing described above every kind of sub pixel. A conceptual view of the image display device in this case is the same as that in which reference symbols of the first gradation converting block 120A, the second gradation converting block 120B, and the third gradation converting block 120C in FIG. 9 are replaced with those of the first gradation converting block 220A, the second gradation converting block 220B, and the third gradation converting block 220C, respectively.

Although the embodiments of the present disclosure have been concretely described so far, the present disclosure is by no means limited to the embodiments described above, and thus various kinds of changes based on the technical idea of the present disclosure can be made.

Figure 22:
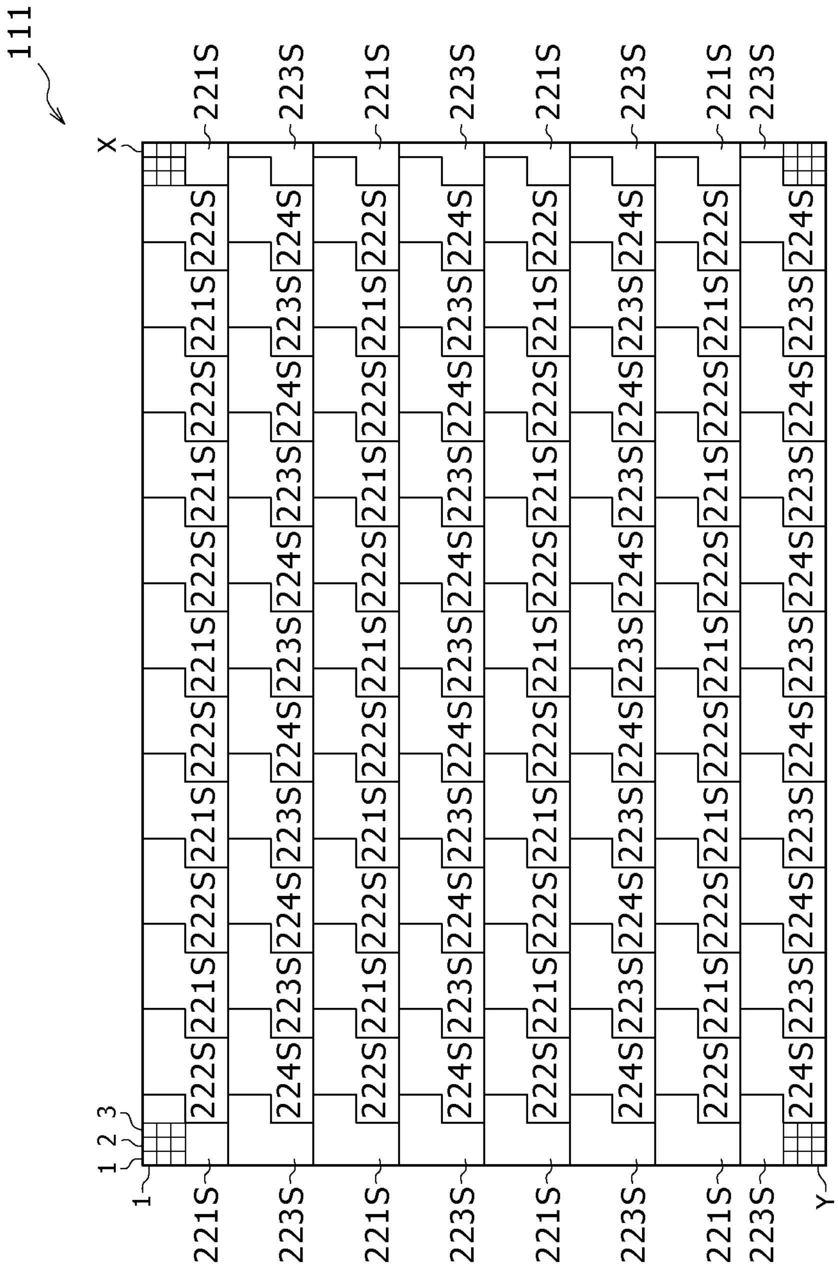
FIG. 22 is a schematic top plan view explaining a change of the second embodiment in the case where the shape of the area in which the value of the output data is selected by the selector is changed.
Figure 23:
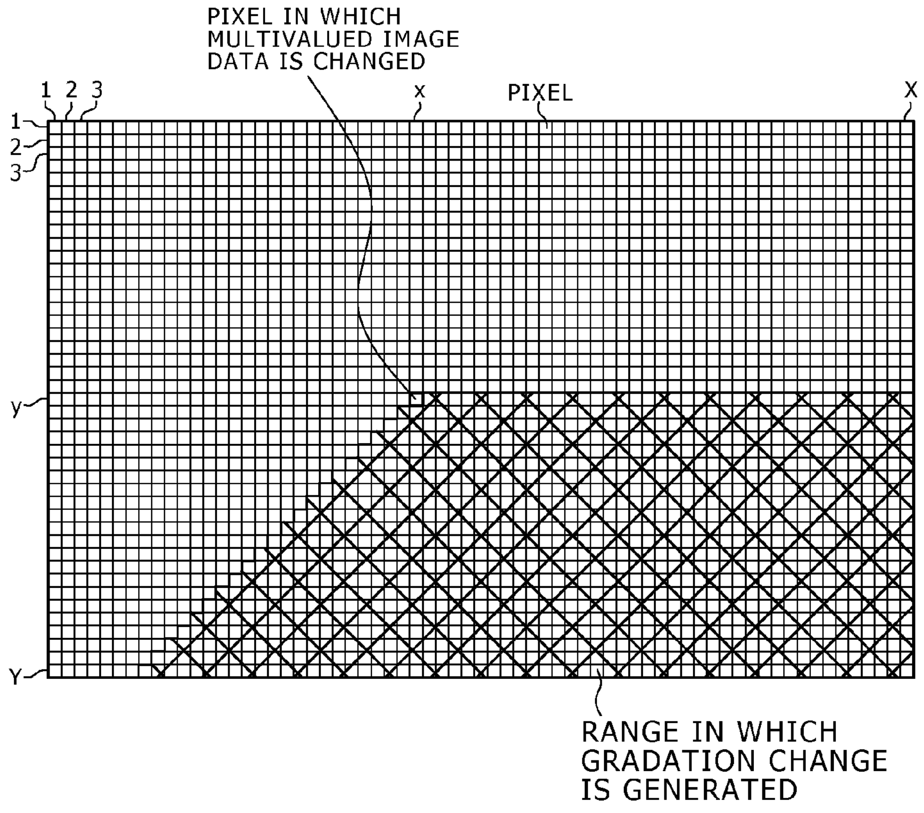
FIG.23 PRIOR ART
FIG. 23 is a schematic top plan view explaining that when a value of multivalued image data corresponding to certain one pixel is changed, a change in gradation is generated over a wide range due to an influence of the error diffusion.

For example, although in the image display device 2 of the embodiment of the present disclosure, the area which does not include any of the pixels in the vicinities of the boundary between each adjacent two partitions has the rectangular shape, as shown in FIG. 22, that area may also have a shape having irregularities added thereto. It is noted that for the sake of convenience of an illustration, in FIG. 22, the illustration of the pixels is omitted except for a part of the pixels.

In addition, although in the image display device 2 of the embodiment of the present disclosure, the processing is executed by using the four kinds of partitions, it is also possible to adopt a configuration such that predetermined pieces of processing using three kinds of partitions are executed by changing amounts of shifting of the partitions. Since with this configuration, the number of error diffusion processing portions in the gradation converting block has only to be three, it is possible to reduce the scale of the gradation converting block.

It should be understood by those skilled in the art that various modifications, combinations, sub combinations and alternations may occur depending on design requirements and other factors insofar as they are within the scope of the appended claims or the equivalent thereof.

What is claimed is:

1. An image display device, comprising:

a display block on which an image is displayed using pixels disposed in a two dimensional matrix; and a gradation converting block that executes gradation converting processing using an error diffusion method, wherein, said gradation converting block partitions an area in which said pixels are disposed into virtual partitions, and carries out the error diffusion method when the gradation converting processing is executed with respect to the pixels within the virtual partitions exclusively within the virtual partitions, thereby carrying out gradation conversion for the image which is displayed on said display block, said gradation converting block partitions the area in which the pixels are disposed into a plurality of different virtual partitions using a plurality of different virtual partitioning processors, and selects a result of the gradation converting processing in an area which is an area within the virtual partitions and which does not include any of the pixels located in a vicinity of a boundary, thereby carrying out the gradation conversion for the image which is displayed on said display block, and each of the plurality of virtual partitioning processors partitions the area in which the pixels are disposed into a plurality of virtual partitions that each overlap at least one of virtual partitions partitioned by the other virtual partitioning processors, and executes the gradation converting processing with respect to each virtual partition in the area in which the pixels are disposed.

2. The image display device according to claim 1, wherein a shape of the area which does not include any of the pixels located in the vicinity of the boundary is a tessellating pattern.

3. The image display device according to claim 1, wherein said gradation converting block partitions the area in which the pixels are disposed into virtual partitions by the plurality of virtual partitioning processors such that each of the virtual partitions includes a portion overlapping among the virtual partitions partitioned by the plurality of virtual partitioning processors.

4. The image display device according to claim 1, wherein said gradation converting block partitions the area in which the pixels are disposed into virtual partitions by the plurality of virtual partitioning processors such that a whole of a display area of said display block are partitioned into virtual partitions by the plurality of virtual partitioning processors, respectively.

5. The image display device according to claim 1, said gradation converting block sets a partition area that is larger than a display area of said display block, partitions the partition area into a plurality of areas, and shifts the partitioned partition area in different directions with respect to the display area for the plurality of virtual partitioning processors, respectively, to partition the area in which the pixels are disposed into virtual partitions by the plurality of virtual partitioning processors.

6. The image display device according to claim 1, wherein said gradation converting block selects the area which does not include any of the pixels located in the vicinity of the boundary, and partitions the selected area into virtual partitions by the plurality of virtual partitioning processors such that a display area of said display block is tessellated.

7. The image display device according to claim 1, wherein the area which does not include any of the pixels located in the vicinity of the boundary for each of the plurality of virtual partitioning processors has a shape such that a display area of said display block is tessellated.

8. The image display device according to claim 1, wherein:

said gradation converting block partitions the area in which the pixels are disposed into virtual partitions and executes the gradation converting processing for each of the virtual partitions using the plurality of virtual partitioning processors in such a way that the plurality of virtual partitioning processors function in parallel with and independently of one another, and said display block displays the image in whole by using each result selected by said gradation converting block.

9. A method of driving an image display device including a display block to display an image by using pixels disposed in a two dimensional matrix, and a gradation converting block that executes gradation converting processing by using an error diffusion method, said method comprising:

partitioning an area in which said pixels are disposed into virtual partitions by said gradation converting block; and carrying out the error diffusion when the gradation converting processing is executed with respect to the pixels within the virtual partitions exclusively within the virtual partitions by said gradation converting block, thereby carrying out gradation conversion for the image which is displayed on said display block, wherein, said partitioning of the area in which said pixels are disposed into virtual partitions by said gradation converting block includes (a) partitioning the area in which the pixels are disposed into a plurality of different virtual partitions by a plurality of virtual partitioning processors, and (b) selecting a result of the gradation converting processing in an area which is an area within the virtual partitions and which does not include any of the pixels located in a vicinity of a boundary, thereby carrying out the gradation conversion for the image which is displayed on said display block, and each of the plurality of virtual partitioning processors partitions the area in which the pixels are disposed into a plurality of virtual partitions that each overlap at least one of virtual partitions partitioned by the other virtual partitioning processors, and executes the gradation converting processing with respect to each virtual partition in the area in which the pixels are disposed.

10. A gradation converter, comprising: a gradation converting block that executes gradation converting processing by using an error diffusion method, wherein:

said gradation converting block partitions an area in which said pixels are disposed into virtual partitions, and carries out the error diffusion when the gradation converting processing is executed with respect to the pixels within the virtual partitions exclusively within the virtual partitions, thereby carrying out gradation conversion for the image, said gradation converting block partitions the area in which the pixels are disposed into a plurality of different virtual partitions by a plurality of virtual partitioning processors, and selects a result of the gradation converting processing in an area which is an area within the virtual partitions and which does not include any of the pixels located in a vicinity of a boundary, thereby carrying out the gradation conversion for the image which is displayed and each of the plurality of virtual partitioning processors partitions the area in which the pixels are disposed into a plurality of virtual partitions that each overlap at least one of virtual partitions partitioned by the other virtual partitioning processors, and executes the gradation converting processing with respect to each virtual partition in the area in which the pixels are disposed.

11. A non-transitory storage medium that stores an image display program to be executed by a computer for driving an image display device including a display block displaying thereon an image by using pixels disposed in a two dimensional matrix, wherein the computer in accordance with the image display program performs the steps of:

partitioning an area in which said pixels are disposed into virtual partitions by said gradation converting block; and carrying out an error diffusion when a gradation converting processing is executed with respect to the pixels within the virtual partitions exclusively within the virtual partitions by said gradation converting block, thereby carrying out gradation conversion for the image which is displayed on said display block, wherein, said partitioning of the area in which the pixels are disposed into virtual partitions includes (a) partitioning of the area in which the pixels are disposed into a plurality of virtual partitions by a plurality of virtual partitioning processors, and (b) selecting a result of the gradation converting processing in an area which is an area within the virtual partitions and which does not include any of the pixels located in a vicinity of a boundary, thereby carrying out the gradation conversion for the image which is displayed on said display block, and each of the plurality of virtual partitioning processors partitions the area in which the pixels are disposed into a plurality of virtual partitions that each overlap at least one of virtual partitions partitioned by the other virtual partitioning processors, and executes the gradation converting processing with respect to each virtual partition in the area in which the pixels are disposed.

* * * * *